(12) United States Patent
Gordon et al.

(10) Patent No.: US 10,244,418 B2
(45) Date of Patent: Mar. 26, 2019

(54) SYSTEMS AND METHODS FOR QUALITY OF EXPERIENCE MEASUREMENT AND WIRELESS NETWORK RECOMMENDATION

(71) Applicant: Devicescape Software, Inc., San Bruno, CA (US)

(72) Inventors: John Gordon, Alameda, CA (US); Simon Wynn, Redwood City, CA (US); Justin Reigle, Hayward, CA (US); Cedar Milazzo, San Bruno, CA (US)

(73) Assignee: Devicescape Software, Inc., San Bruno, CA (US)

( * ) Notice: Subject to any disclaimer, the term of this patent is extended or adjusted under 35 U.S.C. 154(b) by 479 days.

(21) Appl. No.: 14/841,696

(22) Filed: Aug. 31, 2015

(65) Prior Publication Data

US 2015/0373574 A1 Dec. 24, 2015

Related U.S. Application Data

(63) Continuation-in-part of application No. 14/106,631, filed on Dec. 13, 2013, now Pat. No. 9,344,908.
(Continued)

(51) Int. Cl.
*H04W 4/00* (2018.01)
*H04W 24/10* (2009.01)
(Continued)

(52) U.S. Cl.
CPC ......... *H04W 24/10* (2013.01); *H04L 41/5067* (2013.01); *H04L 43/10* (2013.01);
(Continued)

(58) Field of Classification Search
None
See application file for complete search history.

(56) References Cited

U.S. PATENT DOCUMENTS

| 2007/0076696 | A1* | 4/2007 | An | H04L 29/06027 |
| | | | | 370/352 |
| 2009/0222509 | A1* | 9/2009 | King | G06F 17/30194 |
| | | | | 709/203 |

(Continued)

*Primary Examiner* — Zewdu A Beyen
(74) *Attorney, Agent, or Firm* — Marin Patents LP; Gustavo Marin

(57) ABSTRACT

Systems and methods for quality of experience measurement and wireless network recommendation and/or switching are disclosed. In some embodiments, a method comprises connecting to a cellular data network, measuring a signal strength value of a Wi-Fi data network within range of the digital device, calculating an overall Wi-Fi score based on the measured signal strength value of the Wi-Fi data network, measuring a signal strength value of the cellular data network, calculating an available bandwidth of the cellular data network, calculating an overall cellular data network score based on the measured signal strength value of the cellular data network and the calculated available bandwidth of the cellular data network, comparing the overall Wi-Fi score and the overall cellular data network score, and switching from the cellular data network to the Wi-Fi data network based on the comparison of the first bandwidth score to the bandwidth threshold value.

5 Claims, 27 Drawing Sheets

Related U.S. Application Data

(60) Provisional application No. 62/043,986, filed on Aug. 29, 2014, provisional application No. 61/737,082, filed on Dec. 13, 2012.

(51) Int. Cl.
| | |
|---|---|
| *H04W 36/30* | (2009.01) |
| *H04W 36/14* | (2009.01) |
| *H04L 12/24* | (2006.01) |
| *H04L 12/26* | (2006.01) |
| *H04W 24/08* | (2009.01) |
| *H04W 88/06* | (2009.01) |
| *H04W 84/12* | (2009.01) |
| *H04W 84/04* | (2009.01) |

(52) U.S. Cl.
CPC .......... *H04W 24/08* (2013.01); *H04W 36/14* (2013.01); *H04W 36/30* (2013.01); *H04L 43/0864* (2013.01); *H04W 84/042* (2013.01); *H04W 84/12* (2013.01); *H04W 88/06* (2013.01)

(56) References Cited

U.S. PATENT DOCUMENTS

| | | | |
|---|---|---|---|
| 2012/0196644 A1* | 8/2012 | Scherzer ............... | H04W 48/18 455/524 |
| 2014/0080492 A1* | 3/2014 | Shoshan ............... | H04W 40/22 455/449 |

\* cited by examiner

SYSTEMS AND METHODS FOR QUALITY OF EXPERIENCE MEASUREMENT AND WIRELESS NETWORK RECOMMENDATION

CROSS-REFERENCE TO RELATED APPLICATION

The present application is a continuation-in-part of U.S. patent application Ser. No. 14/106,631 filed Dec. 13, 2013, entitled "Systems and Methods for Quality of Experience Measurement and Wireless Network Recommendation," and claims the benefit of U.S. Provisional Patent Application No. 61/737,082 filed Dec. 13, 2012, entitled "Systems and Methods for Quality of Service (QoS) Metrics," and also claims the benefit of U.S. Provisional Patent Application No. 62/043,986 filed Aug. 29, 2014, entitled "Quality of Experience of Wireless Networks," each of which are incorporated herein by reference.

BACKGROUND

1. Field of the Invention

The present invention generally relates to measuring a quality of experience on a wireless network. More particularly, the invention relates to switching to a different network based on the measurements.

2. Description of Related Art

The increasing use of the networks to access information has resulted in a greater dependence on network communication for a variety of activities. With this dependence comes the growing expectation that network access will be ubiquitous. Network access for mobile users has been particularly enhanced by improvements in wireless technology.

Unfortunately, assessing the quality of a wireless network consumes resources on mobile devices as well as the wireless network. As a result, assessing the quality of a wireless network may cause the quality of the network to diminish and result in unnecessary data traffic. For example, traditional "speed test" type applications assess quality by downloading and uploading large amounts of data, and hence do not scale well, incur data traffic costs, and could affect other users of the network by swamping the backhaul data connection to a Wi-Fi access point.

SUMMARY

Systems and methods for quality of experience measurement and wireless network recommendation and/or switching are disclosed. In some embodiments, a method comprises connecting to a cellular data network, measuring a signal strength value of a Wi-Fi data network within range of the digital device, calculating an overall Wi-Fi score based on the measured signal strength value of the Wi-Fi data network, measuring a signal strength value of the cellular data network, calculating an available bandwidth of the cellular data network, calculating an overall cellular data network score based on the measured signal strength value of the cellular data network and the calculated available bandwidth of the cellular data network, comparing the overall Wi-Fi score and the overall cellular data network score, and switching between the cellular data network and the Wi-Fi data network based on the comparison.

In some embodiments, method may further comprise normalizing the signal strength value to a predetermined range. The method may further comprise modifying the overall Wi-Fi score or the overall cellular data network score based upon a selected preference for a cellular data network connection or a Wi-Fi data network connection. The selected preference may be selected by a user of the digital device or a carrier of the cellular data network. The signal strength value may comprise a Received Signal Strength Indicator (RSSI) value.

The method may further comprise measuring a bandwidth of the Wi-Fi data network wherein the overall Wi-Fi score is based on the signal strength value and the bandwidth of the Wi-Fi data network. The signal overall Wi-Fi score may be further based on a packet loss measurement between the digital device and the Wi-Fi data network.

Another example method may be performed by a digital device. The method may comprise connecting to a Wi-Fi data network, the digital device being further capable of communication over a cellular data network, measuring a signal strength value of the Wi-Fi data network, calculating a bandwidth of the Wi-Fi data network, calculating an overall Wi-Fi score based on the measured signal strength value of the Wi-Fi data network and the calculated available bandwidth of the Wi-Fi data network, measuring a signal strength value of the cellular data network, calculating an available bandwidth of the cellular data network, calculating an overall cellular data network score based on the measured signal strength value of the cellular data network and the calculated available bandwidth of the cellular data network, comparing the overall Wi-Fi score and the overall cellular data network score and switching from the Wi-Fi data network to the cellular data network based on the comparison.

In various embodiments, the method may further comprise determining whether the digital device is in active network use based upon a current data usage of the cellular data network by the digital device. The method may comprise determining a link speed of a current connection between the digital device and the Wi-Fi data network and calculating a link score based on the link speed, the Wi-Fi network score being further based on the link score.

The method may further comprise transmitting a plurality of pings to a QoE system accessible over the Wi-Fi data network, receiving a set of ping responses from the QoE system in response to the plurality pings, and calculating a ping score based at least partially on the set of ping responses the Wi-Fi network score being further based on the ping score. The method may further comprise calculating a link quality score based on a Reference Signal Received Quality (RSRQ) value associated with the connection of the digital device to the cellular network, the overall cellular data network score being further based on the link quality score. In some embodiments, the method may further comprise modifying the cellular network score or the Wi-Fi network score based upon a selected preference for a cellular data network connection or a Wi-Fi data network connection. The selected preference may be selected by a user of the digital device or a carrier of the cellular data network.

An example digital device may comprise a communication module, a link module, a bandwidth module, a score module, and a signal selection module. The communication module may be configured to assist in connecting the digital device to a cellular data network and a Wi-Fi data network. The link module may be configured to measure a signal strength value of the Wi-Fi data network within range of the digital device. The signal strength value may be based on one or more signals received by the digital device via the Wi-Fi data network, and to measure a signal strength value of the cellular network. The bandwidth module may be configured to calculate an available bandwidth of the cellular data network. The score module may be configured to calculate an overall Wi-Fi score based on the measured signal strength value of the Wi-Fi data network and to calculate an overall cellular data network score based on the measured signal strength value of the cellular data network and the calculated available bandwidth of the cellular data network. The signal selection module may be configured to compare the overall Wi-Fi score and the overall cellular data network score and to switch the digital device from the cellular data network to the Wi-Fi data network based on the comparison of the first bandwidth score to the second threshold value.

In some embodiments, the digital device may further comprise a modification module configured to modify the overall Wi-Fi score or the overall cellular data network score based upon a selected preference for a cellular data network connection or a Wi-Fi data network connection. The link module may be further configured to determine packet loss between the digital device and the Wi-Fi data network, wherein the overall Wi-Fi score is further based on the packet loss determination. The link module may be further configured to determine link speed between the digital device and the Wi-Fi data network. The overall Wi-Fi score may be further based on the link speed determination.

In some embodiments, the overall Wi-Fi score may be further based on link speed between the digital device and the Wi-Fi data network. The overall Wi-Fi score may be further based on previous measurements by the digital device between the digital device and the Wi-Fi data network. The previous measurements may include past bandwidth measurements between the digital device and the Wi-Fi data network.

DETAILED DESCRIPTION

Figure 1:
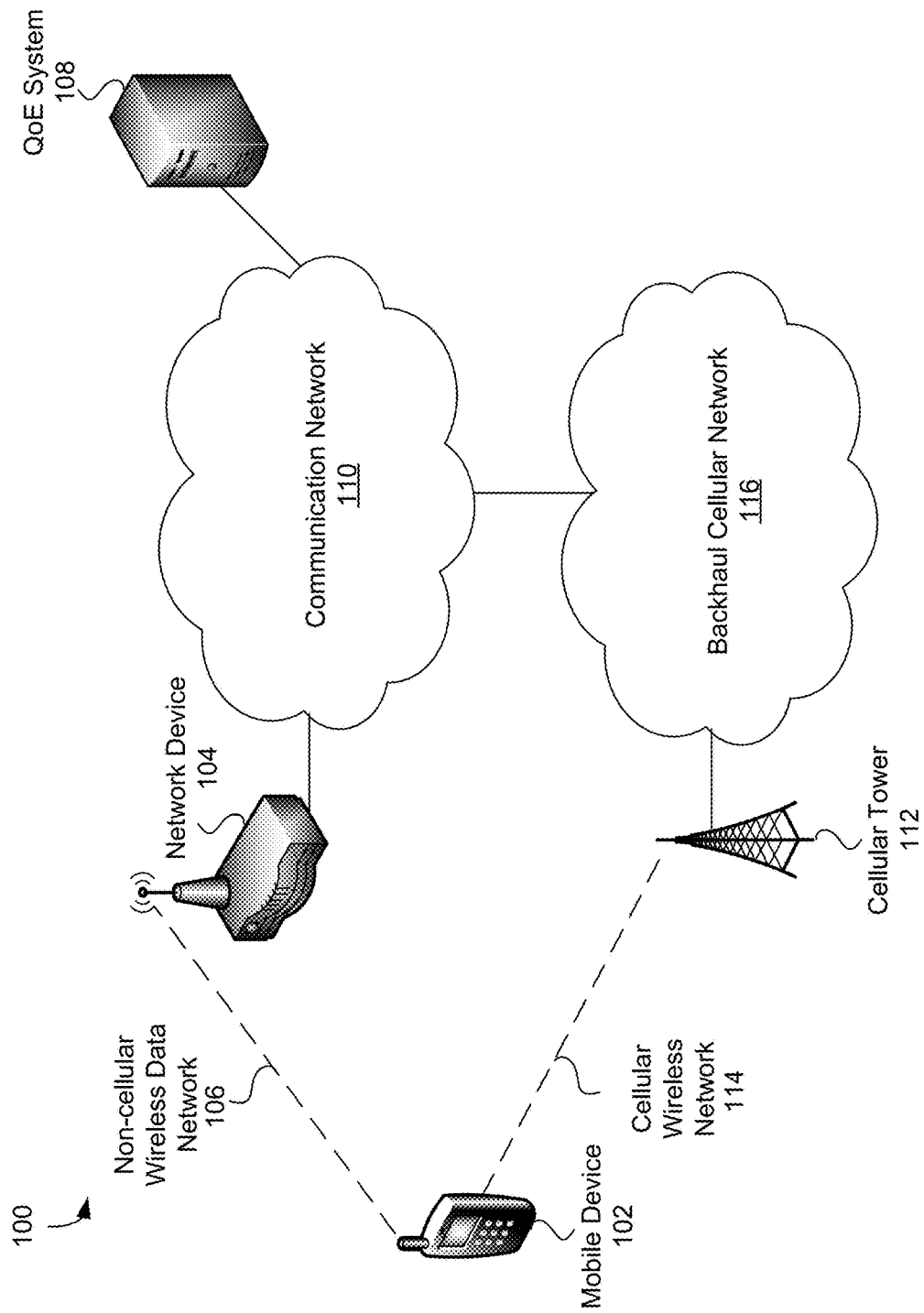
FIG. 1 illustrates a diagram of an environment in which some embodiments may be practiced.

Some embodiments described herein include a method for measuring congestion, jitter, packet loss, and/or signal quality on a wireless network (e.g., a Wi-Fi network) without passing large amounts of traffic in order to predict an acceptable user experience for a user. In various embodiments, the method may utilize bursts of ping traffic (e.g., UDP traffic) to predict congestion. The congestion, for example, may be on a medium to low bandwidth back-haul networks based on empirical calibration.

In some embodiments, the effect of fixed network latency is reduced or attenuated. Fixed network latency may be a function of the number of network hops as a result of geographical distance to another computer such as a server. The fixed network latency may be normalized out of ping measurements, leaving the variable latency represented as jitter. In one example, the fixed network latency is normalized out of the ping measurements by taking a standard deviation of timed ping results and dividing the standard deviation by the average of the timed ping results.

In some embodiments, the method further comprises taking measurements of one or more wireless network link speeds (e.g., Wi-Fi data rates, which are part of the IEEE 802.11 Multi-rate support) to determine the quality of the wireless network. A wireless network link speed may indicate the approximate distance of a digital device (e.g., a cell phone with Wi-Fi connectivity) to a network device (e.g., access point), the network packet loss, and RF signal to interference and noise ration (SINR). The wireless network link speed may assist to predict quality and/or throughput of the wireless network.

A method may utilize ping traffic measurement and/or one or more wireless network link measurements to calculate a quality of experience (QoE) of a wireless network. In some embodiments, the calculation of the QoE is compared to a QoE threshold to determine if the wireless network is of sufficient quality or insufficient quality (e.g., to assign a passing or failing quality score). Any number of QoE calculations may be utilized to determine if a digital device (e.g., a smart phone) should be on a cellular network or a wireless data network (e.g., a Wi-Fi network).

In some embodiments, any number of QoE calculations may be compared to a quality threshold with a failure count applied. A number of consecutive failures (where the QoE value falls below the quality threshold) may occur before any transition to and from the cellular network occur. The failure count can be non-symmetric to make the evaluation of the network prior to transitions more or less forgiving. For example, the failure count may be utilized in determining the quality threshold to make the threshold more forgiving as a user enters a location with Wi-Fi and transitions from cellular to Wi-Fi. The failure count may also be utilized to make the failure count threshold less forgiving when the user leaves the location.

In some embodiments, the quality threshold is dynamically adjusted based on any number of factors. The threshold, for example, may be continuously dynamically adapted or between any number of settings (e.g., between two fixed settings) based on measurements of cellular signal quality, wireless network quality, and/or the hardware of the digital device (e.g., smartphone).

FIG. 1 illustrates a diagram of an environment 100 in which some embodiments may be practiced. In various embodiments, a mobile device 102 may be in communication with a network device 104 over a non-cellular wireless data network 106. The mobile device 102 may also be in communication with a cellular tower 112 over a cellular wireless network 114. A mobile device 102 may be any digital device capable of wireless communication over both cellular and non-cellular wireless networks. A digital device may be any device with a processor and memory. The mobile device 102 may be, for example, a cell phone, smart phone, media device, laptop, or the like. In some embodiments, the mobile device 102 comprises two antennas, one for receiving and transmitting signals with the non-cellular wireless data network 106 and one for receiving and transmitting signals over the cellular wireless network 114.

In various embodiments, a user with the mobile device 102 may access the communication network 110 over a hotspot (e.g., over the non-cellular wireless data network 106 and the network device 104). The mobile device 102, for example, may be a smartphone with both cellular connectivity (e.g., with services provided by a mobile network operator) and non-cellular connectivity (e.g., the mobile device 102 may have Wi-Fi access to access the communication network 110). In one example, the mobile device 102 obtains permission from the network device 104 to access the communication network 110. The mobile device 102 may also have access to the backhaul cellular network 116 over the cellular wireless network 114. In another example the communication network 110 is the Internet.

The network device 104 is an access device such as an access point, router or bridge that can allow communication between devices operationally coupled to the network device 104 with devices coupled to the communication network 110. The network device 104 may require that digital devices be authorized or approved before providing permission to communicate with the communication network 110. In various embodiments, the network device 104 may comprise one or more open ports that allow communication (e.g., data formatted in a DNS protocol) with the communication network 110.

The non-cellular wireless data network 106 may be any data network including, for example, any wireless local area network based on the IEEE 802.11 standards. The cellular network 114 is any network supported by a mobile network operator such as a telecommunications provider that utilizes a wireless network (e.g., based on the 3GPP standards) distributed over land areas served by a cellular tower 112.

The cellular tower 112 is any tower that may provide the mobile device 102 access to the backhaul cellular network 116. In some embodiments, the mobile device 102 communicates over a telecommunications network (e.g., the cellular wireless network and the backhaul cellular network 116) to send data to and receive data from the communication network 110 (e.g., to send to and receive from the Internet). The backhaul cellular network 116 may comprise a core network and intermediate links that may be provided by a telecommunications provider.

In various embodiments, after the mobile device 102 has obtained permission by the network device 104 to access to the communication network 110, the mobile device 102 may determine a quality of experience of data communication.

In one example, a user with a mobile device 102 enters a hotspot. Without previously authenticating or obtaining permission from the network device 104 to access the communication network 110, the mobile device 102 may automatically transmit a credential request as a standard protocol (e.g., formatted in a DNS protocol) over the non-cellular wireless data network 106 to the network device 104. The credential request may identify the network device 104 and/or the non-cellular wireless data network. The network device 104 may receive the credential request at an open port which allows the credential request to be provided to a credential server (not depicted) over the communication network 110. In some embodiments, the QoE System 108 is the credential server.

The credential server may receive the credential request and retrieve network credentials (e.g., a username and password) based, at least in part, on at least some of the information contained within the credential request (e.g., based on the identified network device 104). The credential server may provide a credential request response (e.g., formatted in a DNS protocol) which may include the network credentials back to the mobile device 102. In one example, the credential request response may be provided back over the open port of the network device 104 and subsequently provided to the mobile device 102 over the non-cellular wireless data network.

The mobile device 102 may retrieve network credentials from the credential request response and provide the network credentials to the network device 104 over the non-cellular wireless data network. The network device 104 may authenticate and/or verify the credentials. If approved, the network device 104 may authorize access of the mobile device 102 to the communication network 110. The process of obtaining network credentials, providing the network credentials to the requesting device, and providing the network credentials to the network device 104 is further described by U.S. Pat. No. 8,549,588, entitled "System and Method for Obtaining Network Access," issued Oct. 1, 2013, U.S. Pat. No. 8,196,188, entitled "System and Method for Providing Network Credentials," issued Jun. 5, 2012, and U.S. Pat. No. 8,191,124, entitled "System and Method for Acquiring Network Credentials," issued May 29, 2012, which are all incorporated by reference herein.

Although the hotspot in FIG. 1 depicts separate a QoE System 108 coupled to the communication network 110, those skilled in the art will appreciate that there may be any number of devices (e.g., servers, digital devices, access controllers, and network devices) coupled to the communication network 110. Similarly, there may be any number of network devices, mobile devices, and/or cellular towers.

It should be noted that FIG. 1 is exemplary. Alternative embodiments may comprise more, less, or functionally equivalent components and still be within the scope of present embodiments. For example, as previously discussed, the functions of the QoE System 108 may be split into any number of servers. Further, the QoE System 108 may perform additional functionality. For example, the QoE System 108 may receive credential requests from one or more mobile devices and return credential request responses.

Figure 2:
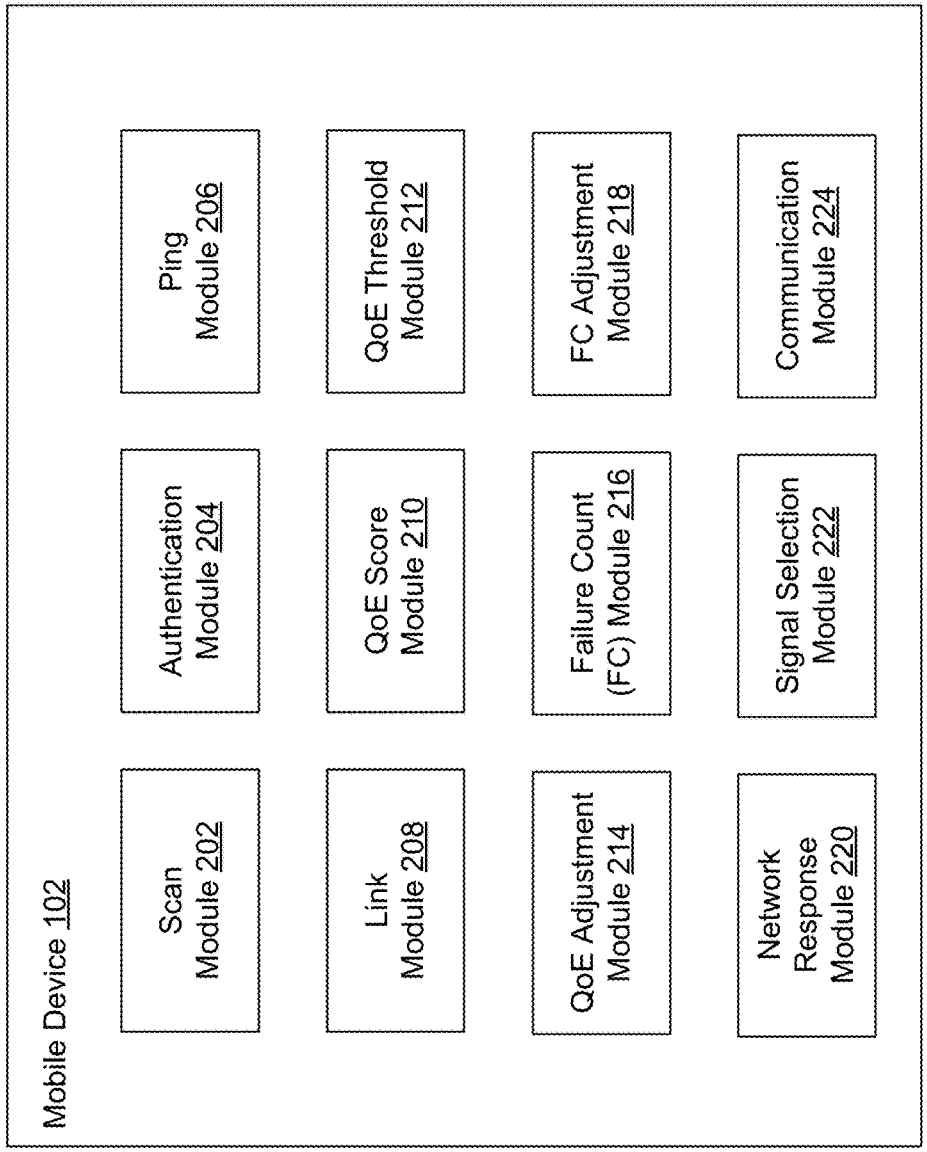
FIG. 2 is a block diagram of a mobile device in some embodiments.

FIG. 2 is a block diagram of a mobile device 102 in some embodiments. The mobile device may comprise a scan module 202, an authentication module 204, a ping module 206, a link module 208, a QoE score module 210, a QoE threshold module 212, a QoE adjustment module 214, a Failure Count (FC) module 216, an FC adjustment module 218, a network response module 220, a signal selection module 222, and a communication module 224.

The scan module 202 may be configured to scan an area for available non-cellular wireless data network such as a non-cellular wireless data network 106. In one example, the scan module 202 scans an area for wireless access points (e.g., hotspots) or any other network devices such as network device 104. The scan module 202 may receive network identifiers that identify the network device 104 over the non-cellular wireless data network 106. In various embodiments, the scan module 202 may be a part of an operating system of the mobile device 102.

The authentication module 204 may be configured to obtain permission from the network device 104 to access the communication network 110. In some embodiments, the authentication module 204 receives a username, password, and/or other information (e.g., acceptance of terms and conditions) from a user of the mobile device 102 and provides the information to the network device 104 to obtain permission to access the communication network 110.

In some embodiments, the authentication module 204 provides a credential request to a credential server, receives a credential request response from the credential server, retrieves network credentials from the credential request response, and provides the network credentials to the network device 104.

The ping module 206 may transmit a plurality of pings to a server (e.g., the QoE system 108) over the communication network 110, receive a set of ping responses, and calculate a ping score. In one example, the ping module 206 transmits the pings to the QoE system 108 on the communication network 110 using the communication module 224. The QoE system 108 may provide a set of ping responses back to the mobile device 102. Each ping response may be measured to determine a ping time (e.g., a roundtrip timestamp). In various embodiments, the QoE system 108 is an echo server.

The ping module 206 may determine a ping score based on the transmission of plurality of pings and the set of ping responses. The ping module 206 may calculate the ping score in any number ways.

In some embodiments, the ping module 206 determines an average of the ping times from the set of ping responses (e.g., a time average based on timestamps). The ping module 206 may further determine a standard deviation from the set of ping responses (e.g., a standard deviation based on timestamps). The ping module 206 may also identify the number of pings transmitted (e.g., packets sent) as well as the number of ping responses received (e.g., packets received).

A ping score may be calculated as follows:

Ping Score=(1−(standard deviation/ping average))* (packets received/packets sent)

In various embodiments, the ping score may be weighted by a multiplying the ping score with a ping weight. In various embodiments, after testing the ping score calculations, a ping weight of 0.6 may be used. Those skilled in the art will appreciate that any ping weight may be used.

Those skilled in the art will appreciate that the calculation of the ping standard deviation divided by the ping average may remove at least some variations in ping times which may be caused by fixed network latency based on the location of the mobile device 102 relative to the QoE system 108 (e.g., relative to the data center hosting the QoE system 108).

The link module 208 may determine a link score based on the link speed. The link module 208 and the link score may be optional. The link speed may be related to packet loss, signal fading and SINR (signal to interference and noise ratio). The link speed may be related to the distance between the mobile device 102 and the network device 104 based on range vs. rate algorithms. Those skilled in the art may utilize any range vs. rate algorithms including those in the IEEE 802,11 standards (See Saiid Biaz, Shaoen Wu, "Rate Adaptation Algorithms for IEEE802.11 Networks: A Survey and Comparison", 978---1---4244---2703, IEEE—http://ieeexplore.ieee.org/xpl/login.jsp?tp=&arnumber=4625680&url=http%3A%2F%2Fieeexplore.ieee.org%2Fxpls%2Fabs_all.jsp%3Farnumber-%3D4625680).

The link module 208 may determine a link maximum and a link speed. The link speed may be the maximum data rate of the link and may be determined by various rate adaption algorithms which base the resulting data rate value on packet loss, signal fading and/or RF SINR. The link maximum may be the maximum expected link speed.

The link score may be calculated as follows:

Link Score=minimum((link speed/link maximum), 1.0)

Where 'minimum' may mean the lower value of either 1, or the result of link speed divided by link maximum.

In various embodiments, the link score may be weighted by a multiplying the link score with a link weight. In various embodiments, after testing the link calculations, a link weight of 0.4 may be used. Those skilled in the art will appreciate that any ping weight may be used.

The QoE score module 210 may calculate a QoE score to determine whether, in some embodiments, communication between the mobile device 102 with devices over the non-cellular wireless data network 106, network device 104, and communication network 110 is of sufficient quality. The QoE score module 210 may calculate a QoE score based on the ping score. In some embodiments, the QoE score module 210 may calculate the QoE score based on the ping score and the link score.

The QoE score may be calculated as follows:

$$\text{QoE Score} = \text{minimum}((\text{ping score} + \text{link score})/(\text{ping weight} + \text{link weight}), 1.0)$$

If there is no ping weight or link weight, the ping weight+link weight may be assumed to be equal to one. In various embodiments, the ping score and the link score are summed together. The ping score and the link score may be a part of a function and not necessarily added together. In some embodiments, the QoE score is based, in part, on multiplying the ping score with the link score instead of summing the two values. Those skilled in the art will appreciate that the QoE score may be determined in any number of ways.

In some embodiments, the QoE score may yield a score between 0 and 1 with, for example, 1 being excellent. The QoE score maybe used to determine a quality of the network.

In another embodiment the ping score and link score are not combined to create one QoE score but rather represent two separate QoE scores with two separate thresholds. In one example, the digital device can be configured to require one or both QoE thresholds to be satisfied to continue the use of the non-cellular wireless data network 106.

The QoE score module 210 or the QoE threshold module 212 may compare the QoE score with a QoE threshold to determine if a network is of sufficient quality. For example, if the QoE score is below the QoE threshold, the QoE score module 210 or the QoE threshold module 212 may determine that the network is of insufficient quality.

The optional QoE adjustment module 214 may adjust the QoE threshold. The QoE threshold may be adjusted in many different ways for different reasons. In some embodiments, the QoE adjustment module 214 may adjust the threshold based on user configurations (e.g., to demand higher quality connections or to allow for lower quality connections).

In some embodiments, the QoE adjustment module 214 may adjust the QoE threshold based on the quality of the cellular wireless network 114. For example, if the cellular wireless network 114 is an LTE network, which typically offer high performance, the QoE adjustment module may adjust the QoE threshold to require higher quality connectivity so the user may receive comparable non-cellular performance to that of the cellular wireless network 114. In another example, if the cellular wireless network 114 is of low speed or quality, the QoE adjustment module may adjust the QoE threshold to allow for lower quality connectivity.

In some embodiments, the QoE threshold may also be dynamic and part of an adaptive system. In this case, the QoE adjustment module 214 may determine the overall QoE threshold for Wi-Fi connections. In some embodiments, to avoid any cellular traffic created during a cellular QoE type test (and resulting cellular signaling), the cellular technology type may be assigned a weighting and applied to an adaptive QoE threshold algorithm. For example, the following weights may be applied to cellular technology types:

2G=2
3G=5
4G=9

The QoE score algorithm used for Wi-Fi quality assessment may return a value between 0 and 1.0. Using these cellular technology type weightings, the QoE threshold may be derived as (Technology type)/10. For 2G networks for example, any Wi-Fi QoE score greater than 0.2, for example, may result in the non-cellular wireless data network 106 connection being used, since 2G cellular data networks would likely be much slower than Wi-Fi. Conversely, for 4G networks (for example LTE), the Wi-Fi QoE score may be required to equal or be greater to 0.9, for example, for the connection to be considered usable since 4G networks operate at data rates that sometime exceed those of Wi-Fi networks.

Cellular networks also provide data that indicates directly or indirectly the actual quality of the data service. For example, LTE (Long Term Evolution/4G) networks implement link adaptation where the mobile handset reports to the eNodeB (base station) the Channel Quality Index, or CQI. This value may be used to determine the cellular modulation scheme and code rate that best suits the signal to interference plus noise ratio (SINR). Since the CQI is a direct indicator of the cellular data connection quality, it may be used to determine an adaptive QoE threshold for Wi-Fi connections.

For example, CQI values may range from 0 to 15, where 15 is the best possible connection quality. In this case an adaptive QoE threshold may be derived as follows:

$$\text{QoE threshold} = \text{CQ1} * (2/3)$$

In this case, the best possible LTE connection may block any possible Wi-Fi connections, and decreasing LTE quality may lower the threshold to zero, allowing all Wi-Fi connections without making any selection choices based on the QoE score.

In some embodiments, cellular signal strength, for example Reference Signal Received Power (RSRP) and Signal to Inference and Noise Ration (SINR) are used to determine LTE quality. Those skilled in the art will appreciate that there are many cellular technologies and cellular measurement values that can be used to determine cellular network quality.

The failure count (FC) module 216 may calculate a number of times the QoE score indicates insufficient quality (e.g., when compared to the QoE threshold). In one example, the FC module 216 determines the number of consecutive QoE scores that indicate that network connectivity is of insufficient quality. In another example, the FC module 216 determines the number of QoE scores that indicate that network connectivity is of insufficient quality over a predetermined period of time (e.g., 5 minutes).

Those skilled in the art will appreciate that there are many ways that the FC module 216 may calculate the significance of sufficient or insufficient quality.

The FC module 216 may be configured to compare the failure count (i.e., the number of times the QoE is found to be of insufficient quality when compared to the QoE threshold) to a FC threshold. The FC module 216 may compare consecutive failures to the FC threshold or may compare failures over a predetermined period (e.g., 3 minutes) to the FC threshold.

The optional FC adjustment module 218 module may change the FC threshold to adjust the number of times a QoE failures can be seen before a determination, recommendation, or switch back to the cellular wireless network (e.g., from an unsatisfactory non-cellular wireless data network 106) is initiated. The FC threshold may be adjusted to make a user's mobile device 102 more forgiving as a user walks into a venue that provides Wi-Fi (e.g., since the signal strength and hence quality could be initially poor as they approach), and then adjusts the FC threshold to be less forgiving once a connection has been deemed of acceptable quality. The user is, for example, now in the venue, using the non-cellular wireless data network 106, and as they leave, the handset may be less forgiving about quality. As a result, the handset may move back to the cellular data network 114 after fewer consecutive failures.

Those skilled in the art will appreciate that an Internet connection, especially a wireless one, may experience very short connectivity issues, as can the Internet itself. A short interruption in connectivity may be due to a network issue, or may be due to brief lack of RF coverage in a building. As a result of interruptions in connectivity, QoE score measurement may determine a quality failure; if a mobile device 102 is disconnected immediately, the benefit of the non-cellular wireless data network 106 connection may be lost once this brief connectivity issue was resolved. In some embodiments, the QoE threshold makes sure the "n" successive tests are performed before a mobile device 102 is recommended to be switched back to the cellular network, the non-cellular wireless data network 106 connection is terminated, or the mobile device 102 is commanded to switch back to the cellular network.

The network response module 220 may be configured to determine whether to maintain connectivity with the non-cellular wireless data network based on the QoE score. In various embodiments, if the failure count exceeds the failure count threshold, the network response module 220 may remove the non-cellular wireless data network 106 from a list of acceptable or preferred wireless networks (e.g., the non-cellular wireless data network 106 may be removed from a network availability list of the mobile device 102).

In some embodiments, the network response module 220 directs the mobile device 102 to terminate the connection to the non-cellular wireless data network 106. Once a mobile device 102 disconnects from the non-cellular wireless data network 106 and/or is switched back to the cellular wireless network 114, the previously connected non-cellular wireless data network 106 may be marked down for a set period of time, referred to in the system as "blacklisted." After a predetermined markdown time (e.g., often 30 to 60 minutes), the system may no longer be "blacklisted" and an attempt may be made to reconnect the mobile device 102.

In some embodiments, the network response module 220 may provide an indicator of the quality of the non-cellular wireless data network 106. The indicator may be shared with the operating system of the mobile device 102 and/or other software or agents of the mobile device 102 thereby allowing other software or hardware to take action based at least partly on the quality of the non-cellular wireless data network 106. In some embodiments, the network response module 220 provides a flag indicating that the non-cellular wireless data network 106 is not of sufficient quality. In various embodiments, the network response module 220 provides an identifier indicating degree of quality and/or degree of insufficient quality of the network response module 220.

In some embodiments, the QoE score is sent to the QoE system 108 over the communication network 110 and network device 104 to record the historical quality of the non-cellular wireless data network 106.

The optional signal selection module 222 may be configured to select a network (e.g., one or more non-cellular wireless data networks 106 or cellular wireless network 114) based on the quality of the non-cellular wireless data network 106. In some embodiments, if the failure count is greater than the failure count threshold, the signal selection module 222 may direct the mobile device 102 to disconnect from the non-cellular wireless data network 106 and connect or utilize a data connection with a cellular service provider or other available Wi-Fi connection.

The communication module 224 may be configured to communicate with a non-cellular wireless data network 106 (e.g., IEEE 802.11x) and cellular wireless network 114 (LTE).

Figure 3:
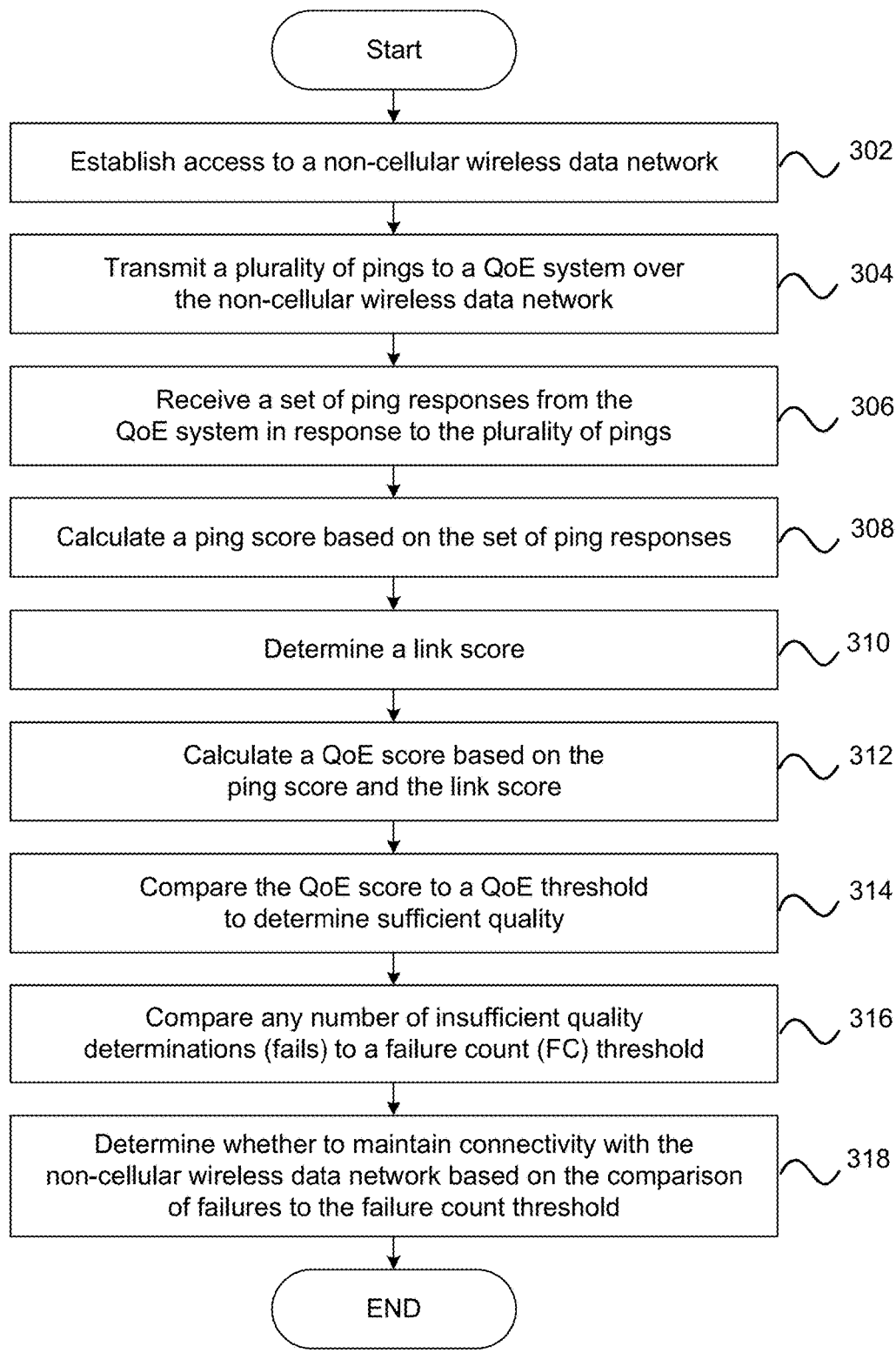
FIG. 3 is a flow chart for determining a quality of communication of a mobile device over a non-cellular wireless data network, a network device, and a communication network in some embodiments.

FIG. 3 is a flow chart for determining a quality of communication of a mobile device 102 over a non-cellular wireless data network 106, a network device 104, and a communication network 110 in some embodiments. In step 302, the scan module 202 and authentication module 204 may establish access to a non-cellular wireless data network 106.

In step 304, the ping module 206 may transmit a plurality of pings (e.g., a burst) to a QoE system over the non-cellular wireless data network 106. In some embodiments, the ping module 206 transmits the pings formatted using the UDP protocol. By formatting pings with the UDP protocol, overhead and resources may be reduced, and the ping score may represent packet loss effectively due the absence of TCP retransmission. In some embodiments, the ping module transmits 10 pings over every predetermined period of time (e.g., every 60 seconds).

In step 306, the ping module 206 receives a set of ping responses from the QoE system in response to the plurality of pings. For each ping response the network round trip time is measured.

In step 308, the ping module 206 calculates a ping score based on set of ping responses. The ping score is further described with respect to FIG. 4.

In step 310, the link module 208 determines a link score. The link score is further described with respect to FIG. 10.

In step 312, the QoE score module 210 calculates the QoE score based on the ping score and the link score. In various embodiments, the QoE score is based on the ping score but not the link score. In some embodiments, the QoE score is based on the link score but not the ping score. In some embodiments the ping and link score are not combined into one QoE score, but rather used as separate QoE scores.

In step 314, the QoE score module 210 or the QoE threshold module 212 may compare the QoE score to a QoE threshold to determine if the connectivity over the non-cellular wireless data network 106 to the communication network 110 is of sufficient quality. In one example, the FC module 216 may compare the insufficient quality determinations by the QoE score module 210 or the QoE threshold module 212 (based on comparing the QoE score with the QoE threshold). If the non-cellular wireless data network 106 is not of sufficient quality, the FC module 216 may determine a failure count (e.g., increment a failure count).

In step 316, the FC module 216 may compare a number of failures (e.g., a number of determinations that a network is of insufficient quality) to a FC threshold which is further described herein.

In step 318, the network response module 220 may determine whether to maintain connectivity with non-cellular wireless data network 106 based on comparison of failures to failure count threshold. As discussed herein, the network response module 220 may be configured to determine whether to maintain connectivity with the non-cellular wireless data network based on the QoE score. In various embodiments, if the failure count exceeds the failure count threshold, the network response module 220 may remove the non-cellular wireless data network 106 from a list of acceptable or preferred wireless networks, may direct the mobile device 102 to terminate the connection to the non-cellular wireless data network 106, or provide an indicator of the quality of the non-cellular wireless data network 106.

Figure 4:
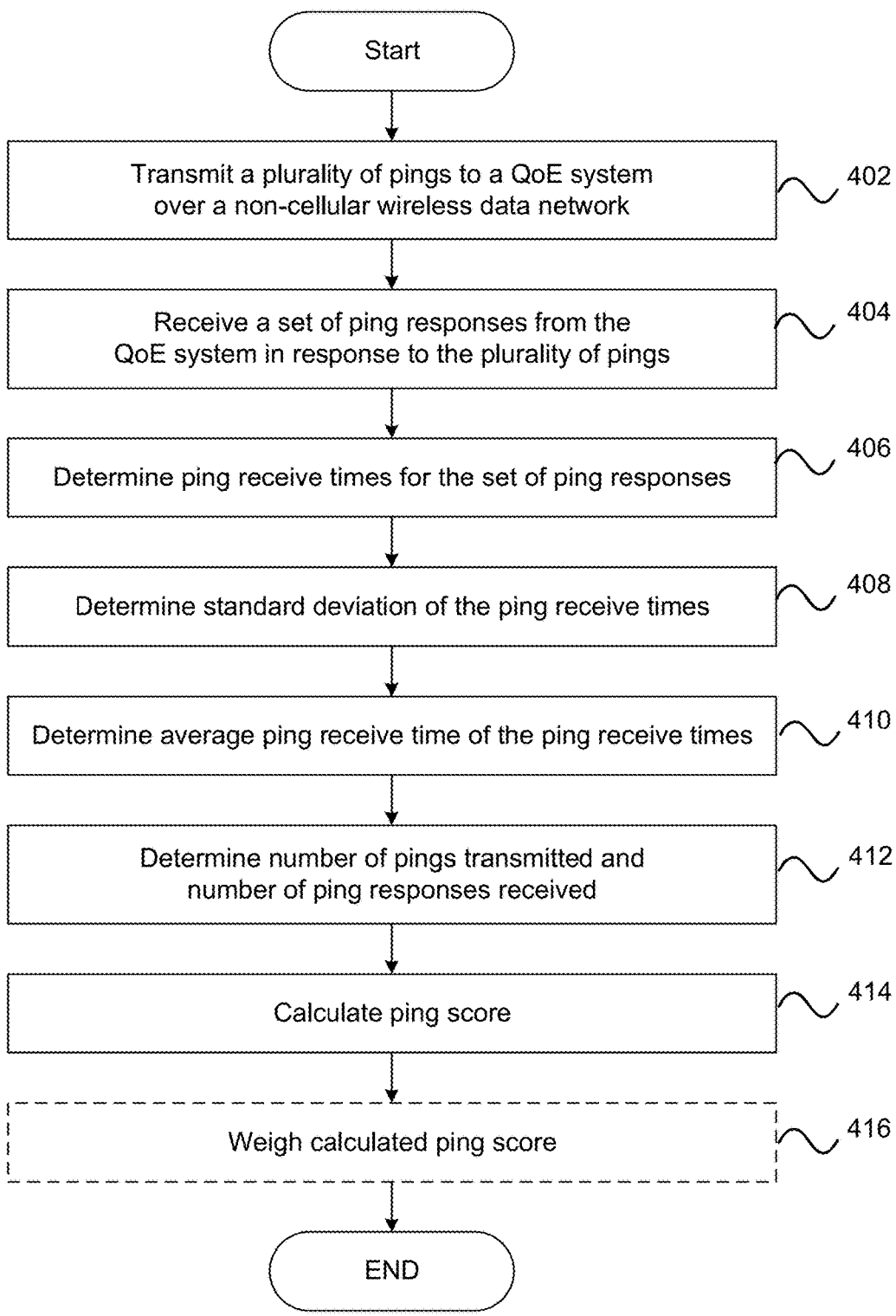
FIG. 4 is a flowchart of calculating a ping score in some embodiments.

FIG. 4 is a flowchart of calculating a ping score in some embodiments. In step 402, the ping module 206 of a mobile device 102 transmits a plurality of pings to a QoE system 108 over the non-cellular wireless data network 106, network device 104, and communication network 110. Those skilled in the art will appreciate that there may be any number of pings that are transmitted. In one example, 10 pings are transmitted.

In step 404, the ping module 206 receives a set of ping responses from the QoE system 108 in response to the transmission of the plurality of pings. In some embodiments, the QoE system 108 comprises an echo server. Any number of ping responses may be received. In some embodiments, the number of ping response is equal to or less than the number of pings transmitted of the plurality of pings.

In step 406. The ping module 206 measures the ping round-trip times from the set of ping responses.

In step 408, the ping module 206 may determine the standard deviation of ping receive times. In step 410, the ping module may determine an average ping receive time of the ping receive times. In step 412, the ping module may determine the number of pings transmitted and the number of ping response received.

In step 410, the ping module 206 calculates the ping score. A ping score may be calculated as follows:

Ping Score=(1−(standard deviation/ping average))* (packets received/packets sent)

In step 412, the ping module 206 may modify the ping score by weighing the ping score with a ping weight.

As discussed herein, the network response module 220 may wait for a number of quality failures (e.g., a number of times a QoE score indicates that the communication is of insufficient quality when compared to a QoE threshold) to surpass or equal a predetermined number of times (e.g., exceed or meet a failure count threshold) before recommending or commanding that a wireless network be disconnected.

In some embodiments, an averaging filtering is applied to the ping score to smooth out variations in the ping score. In various embodiments, the averaging filter may take the following form:

ping score$_n$=ping score$_{n-1}$+(sampled ping score− ping_score$_{n-1}$)/timeconstant In some embodiments, a mobile device 102's own traffic (e.g., downloading updates, applications, streaming video, and the like) may cause a ping score to drop, potentially below the threshold of acceptance which may cause unnecessary switching of networks. In various embodiments, the QoE score module 210 may suspend transmitting the plurality of pings, determining the ping score, determining the link score, and calculating the QoE score. The QoE score module 210 may suspend any number of operations when, for example, current traffic passes through the mobile device 102 WLAN interface (e.g., communication module 224) passes a configurable traffic threshold.

Figure 5:
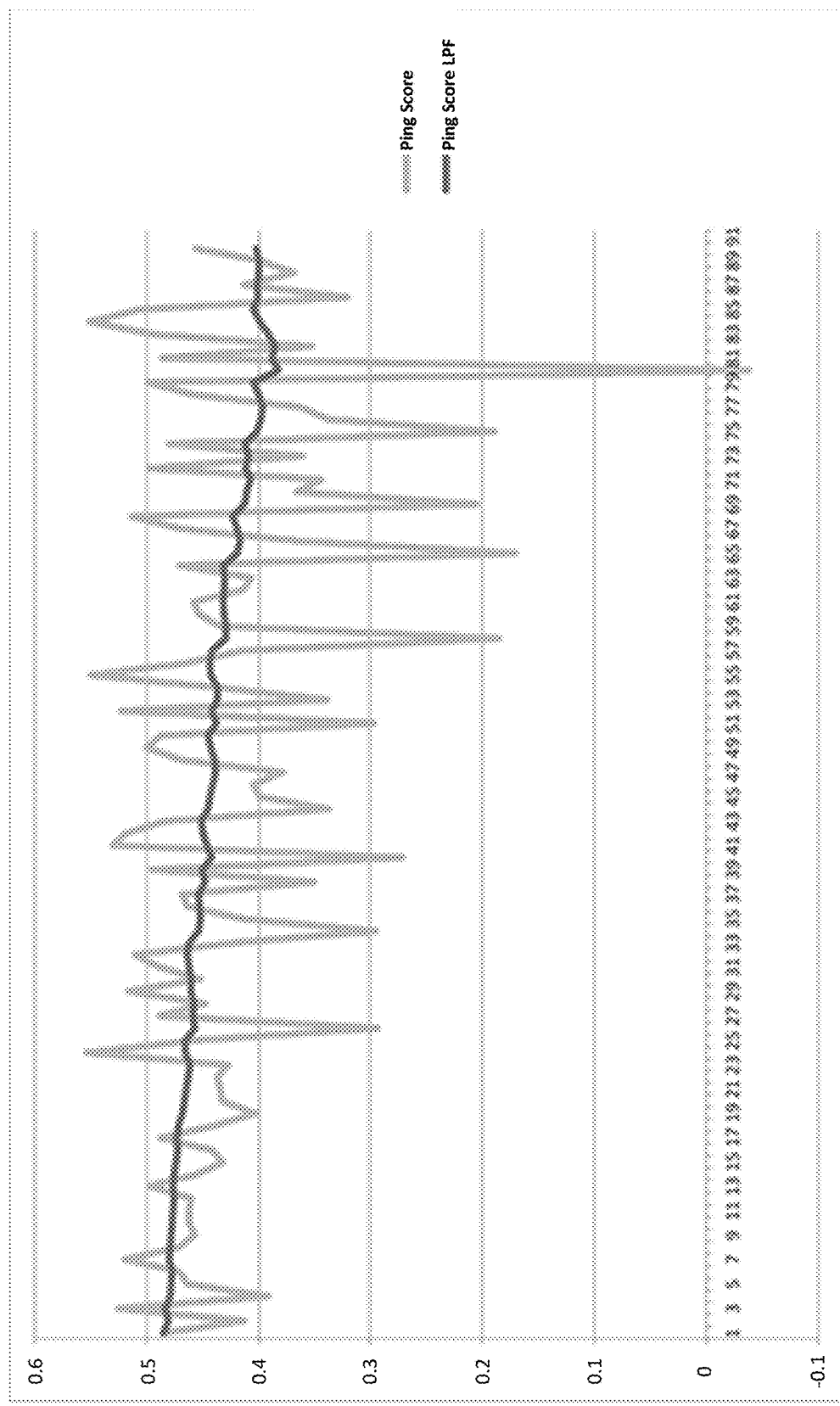
FIG. 5 depicts the ping score as the network (e.g., the communication network) becomes more congested in some embodiments.

FIG. 5 depicts the ping score as the network (e.g., the communication network 110) becomes more congested in some embodiments. The "Ping Score" may represent the raw data, while "Ping Score LPF" may show the averaging filtered results. The unfiltered results, although showing a trend, vary wildly, with clear trends and measurements discernable from the averaging filtered results.

Figure 6:
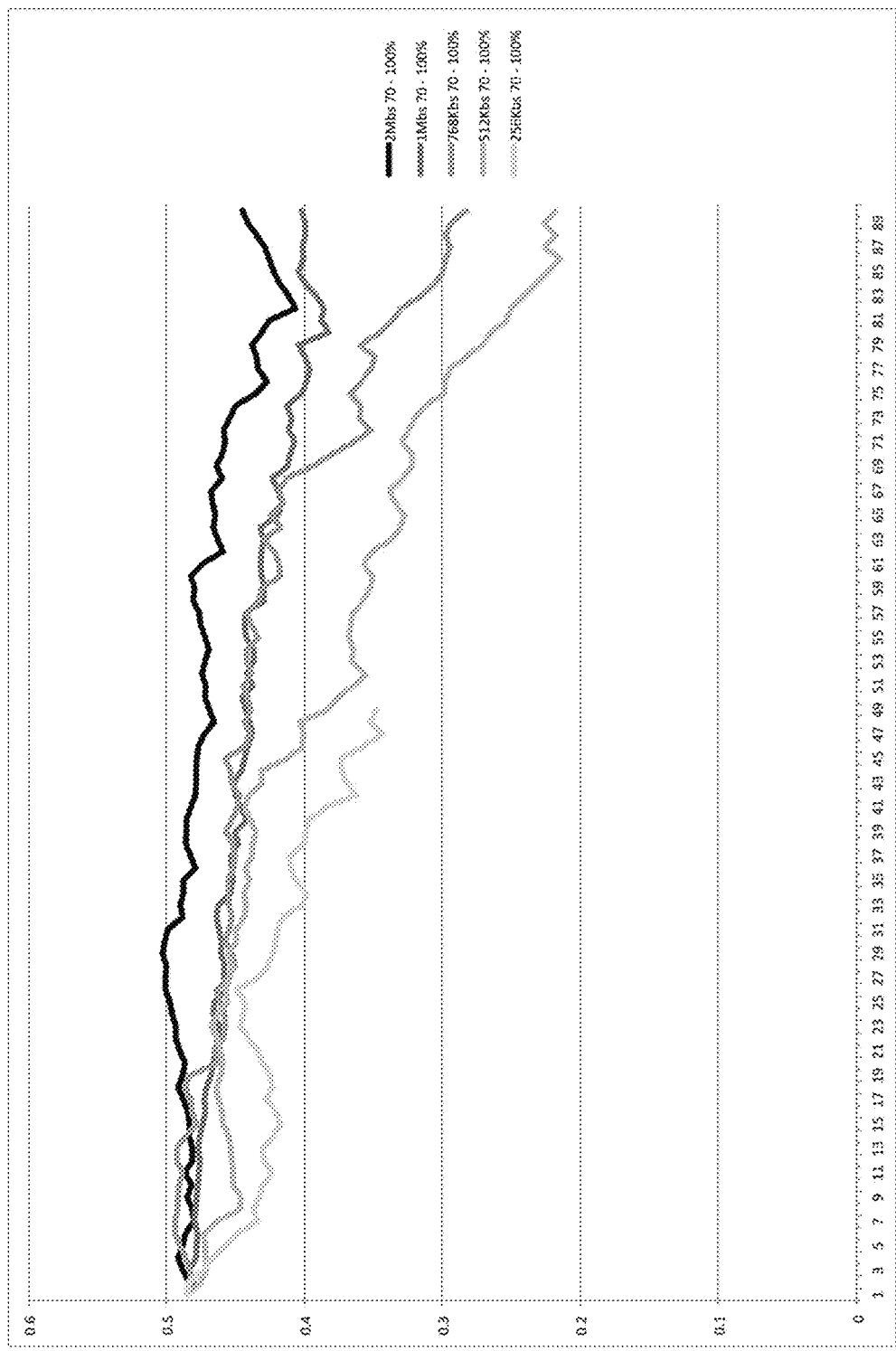
FIG. 6 depicts results from a backhaul congestion test of ping score vs. QoE sample number in some embodiments.

FIG. 6 depicts results from a backhaul congestion test of ping score vs. QoE sample number in some embodiments. Each line on the graph represents the congestion test from 70% to 100%, 15 minutes per congestion value. Six congestion ranges were used, so 90 total samples were captured, one per minute, indicated on the Y axis.

Based on the graph depicted in FIG. 6, when there is a reasonable amount of wired network bandwidth available (>2 Mbs) the ping score algorithm is insensitive to congestion, showing only a drop of 0.1 with the current weighting values. As the backhaul decreases in capacity, the algorithm may become increasingly sensitive to congestion. For example a 512 Kbs backhaul shows a range of 0.5 to 0.2 for the ping score. Note that with a 256 Kbs backhaul, once congestion reaches 90%, the QoE tests start to fail in FIG. 6 and return no results. This illustrates the QoE tests effectiveness at measuring congestion on non-cellular wireless networks with marginal capacity wired network backhaul connections.

Figure 7:
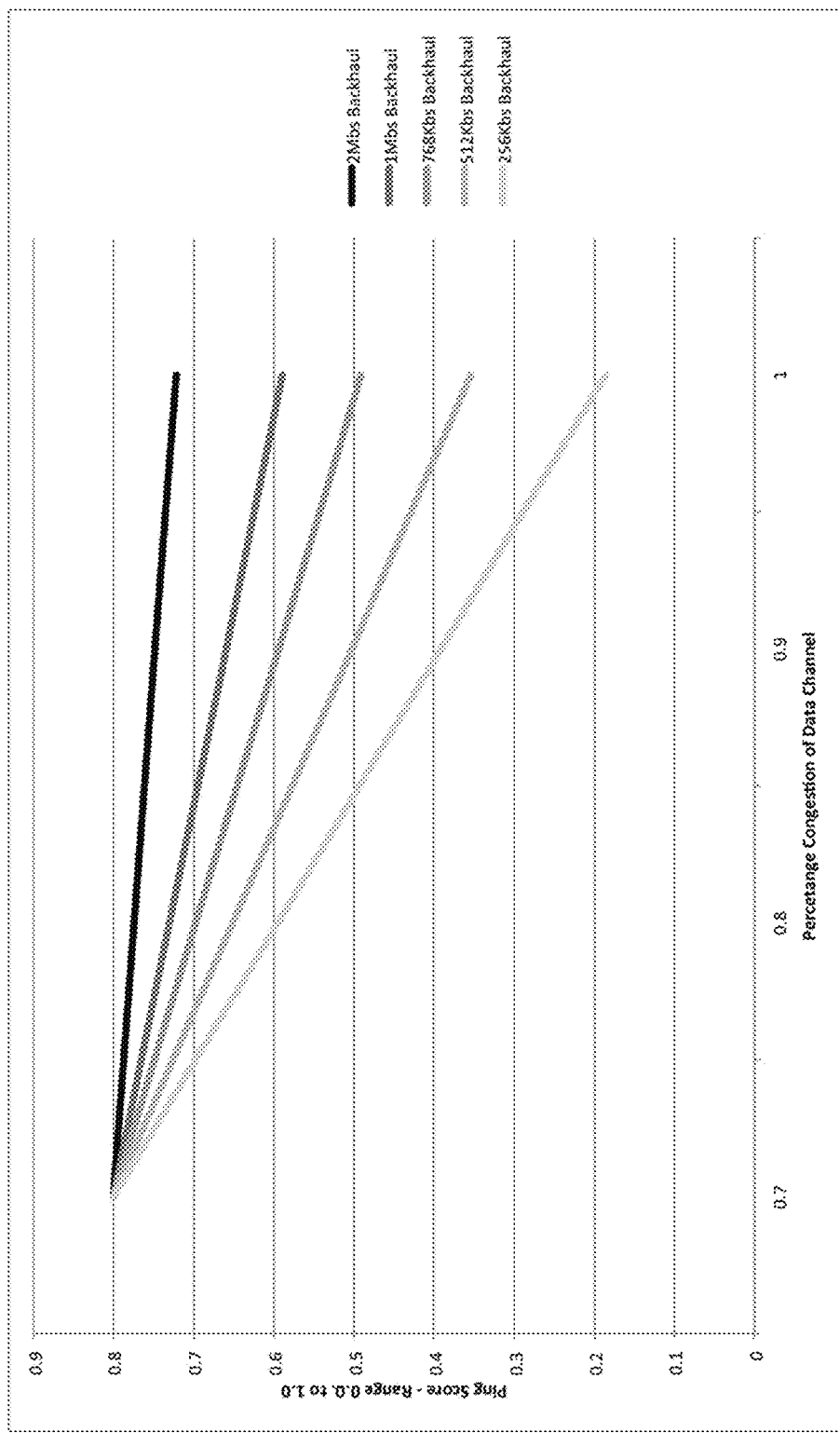
FIG. 7 depicts modelled ping score vs. backhaul capacity and channel congestion in some embodiments.

FIG. 7 depicts modelled ping score vs. backhaul capacity and channel congestion in some embodiments. In some embodiments, a mathematical model can be built to represent ping score as a function of backhaul capacity and percentage congestion in the backhaul channel. This may be performed by straight-line approximating each of the curves, since the curves are fairly flat and this avoided curve matching. The relationship of slope against backhaul capacity may be calculated using a polynomial least-square fitting.

Normalizing the ping score range to 0.0, to 1.0, this yields the following formula for ping score:

Ping Score=(C−0.7)(−0.783*B$^2$+2.79×B−2.71)+0.8
Where: C=Congestion as a decimal (70%==0.7), and B=Backhaul capacity in Mbs FIG. 7 shows a plot of the ping score formula over its valid range of 70% to 100% network congestion.

Figure 8:
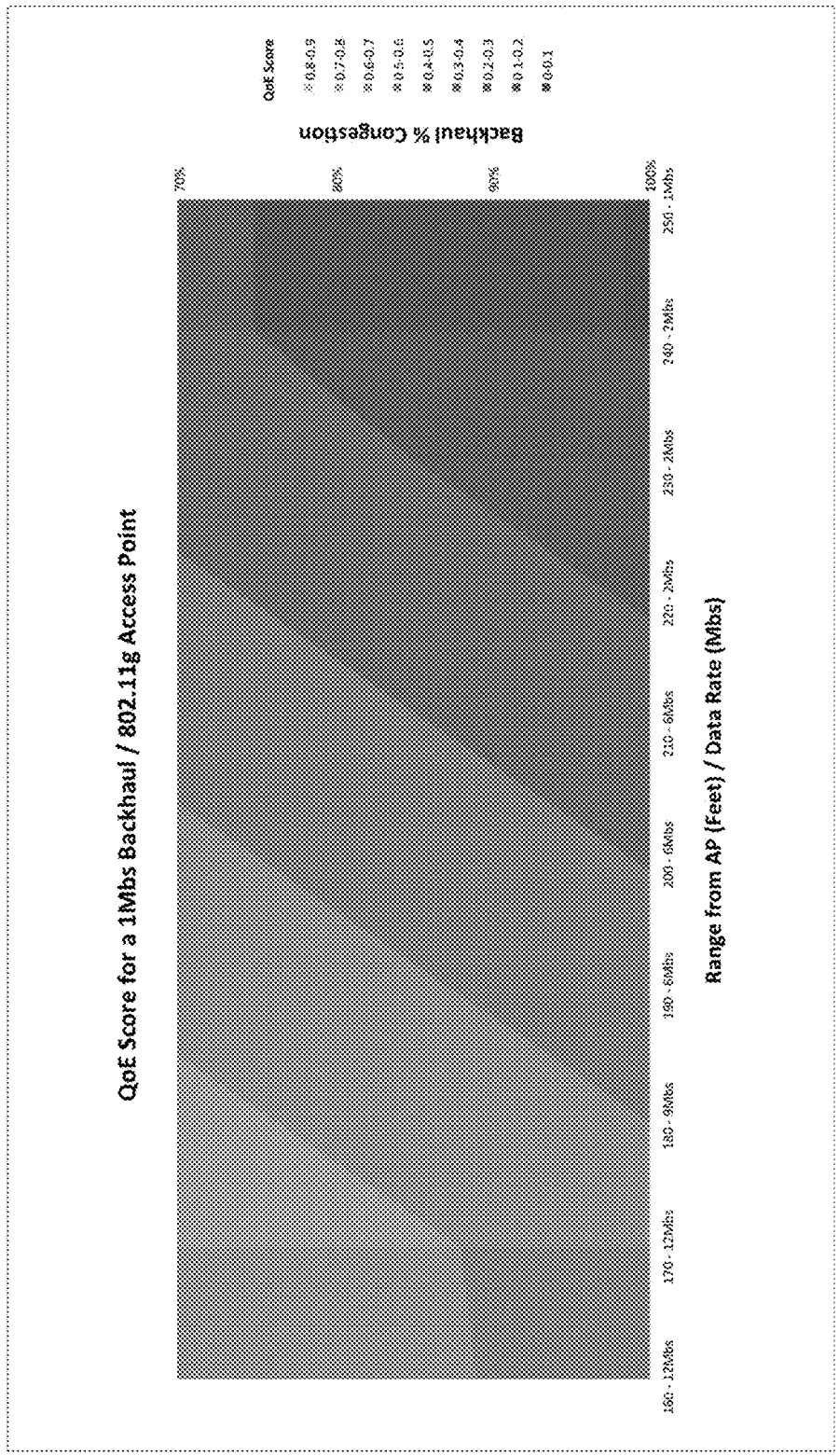
FIG. 8 is an exemplary combined contour graph of QoE score vs. percentage backhaul congestion, the distance a digital device is from a Wi-Fi hotspot, and the Wi-Fi data rate in some embodiments

FIG. 8 is an exemplary combined contour graph of QoE score vs. percentage backhaul congestion, the distance a digital device is from a Wi-Fi hotspot, and the Wi-Fi data rate in some embodiments. The exemplary graph illustrates that as the digital device moves further from the Wi-Fi hotspot, and as congestion increases, the QoE score decreases. The graph is for an 802.11g access point with a 1 Mbs backhaul.

Figure 9:
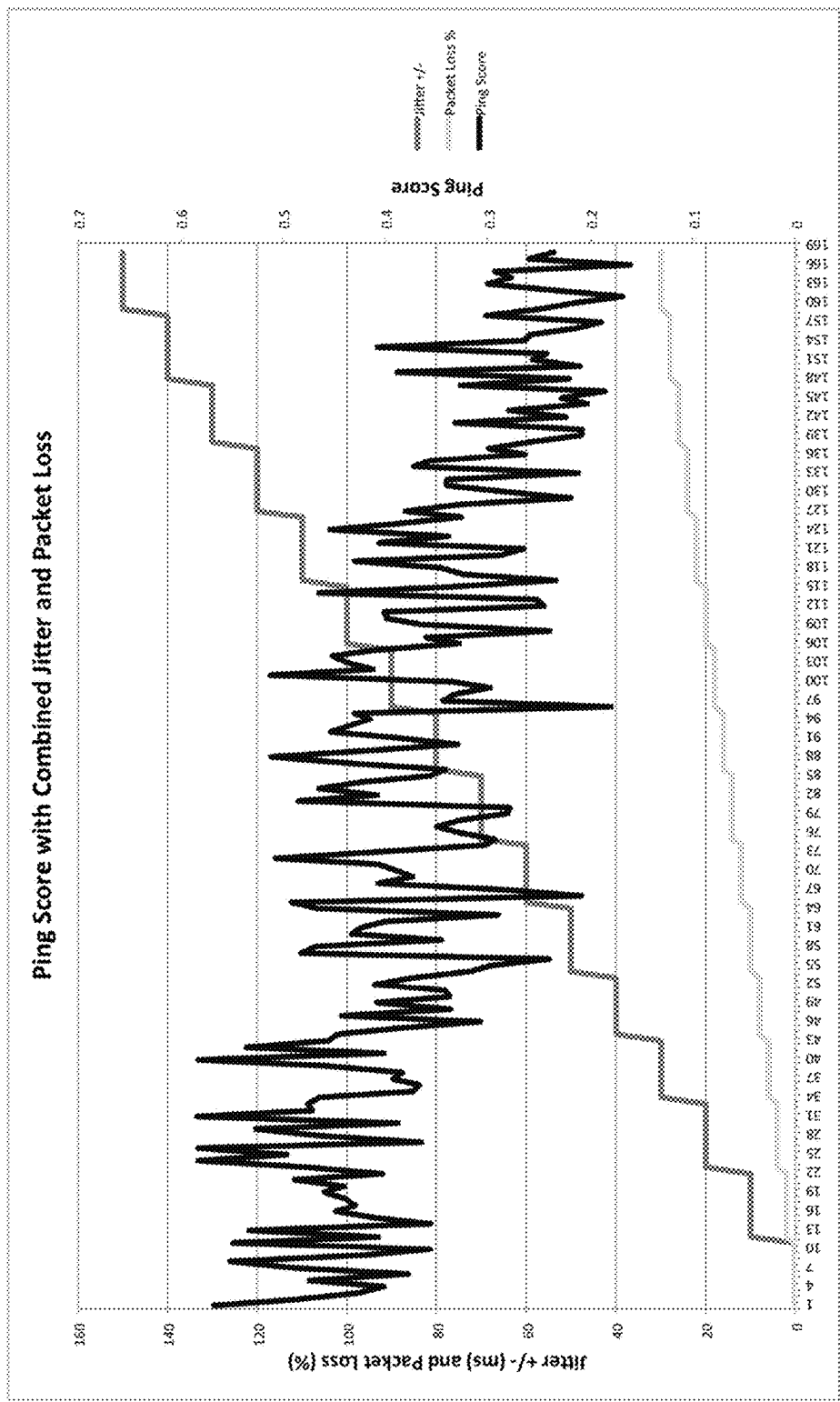
FIG. 9 is an exemplary graph showing how the ping score may decrease as both network packet loss and jitter increase in some embodiments.

FIG. 9 is an exemplary graph showing how the ping score may decrease as both network packet loss and jitter increase in some embodiments.

Figure 10:
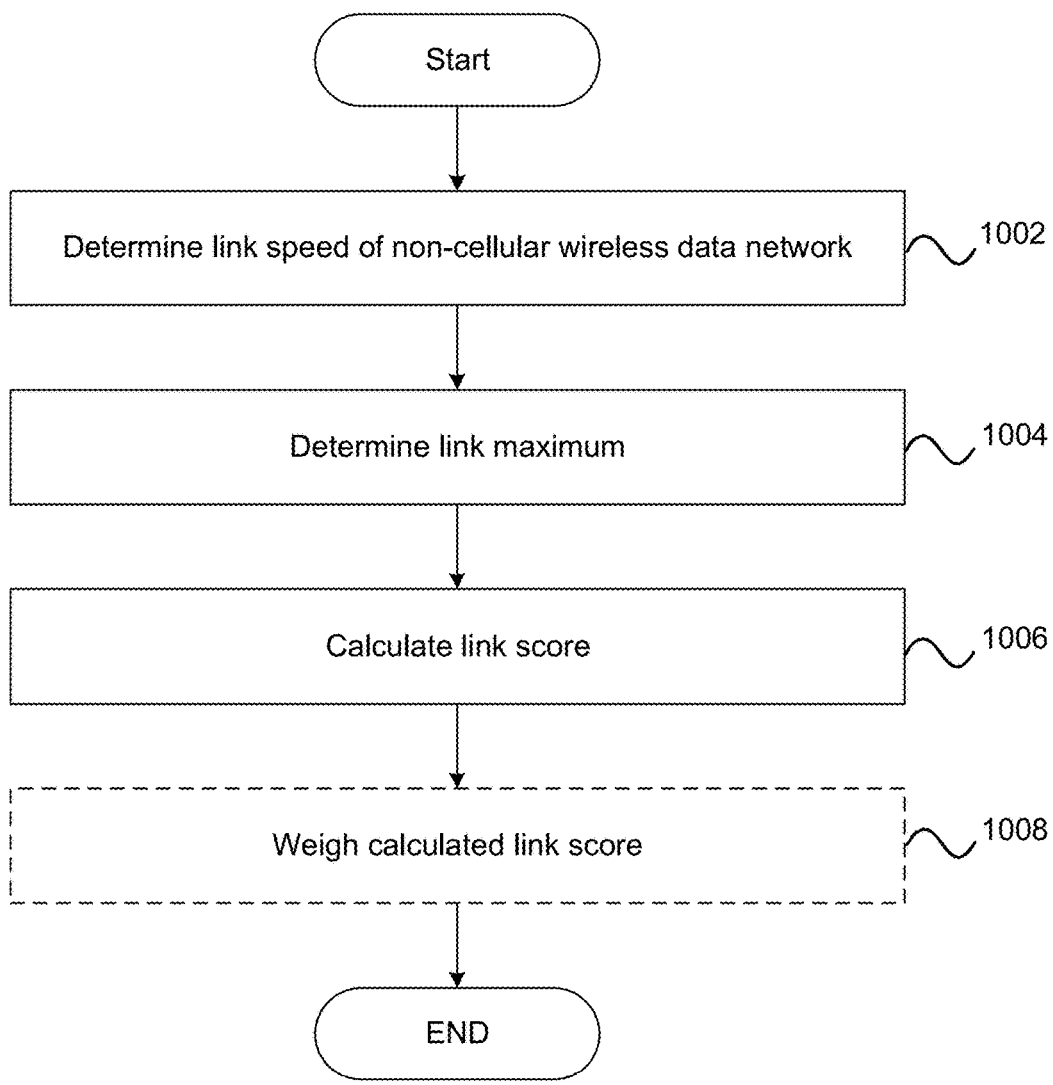
FIG. 10 is a flowchart for determining a link score in some embodiments.

FIG. 10 is a flowchart for determining a link score in some embodiments. In step 1002, the link module 208 determines a link speed of the non-cellular wireless data network 106. In step 1004 the link module 208 determines a link maximum. In step 1006, the link module 208 calculates a link score.

The link score may be calculated as follows:

Link Score=minimum((link speed/link maximum), 1.0)

In optional step 1008, the link score may be weighted by a multiplying the link score with a link weight. In various embodiments, after testing the link calculations, a link weight of 0.4 may be used. Those skilled in the art will appreciate that any ping weight may be used.

In various embodiments, the higher the packet loss and the lower the SINR, the lower the data rate, typically indicating that the mobile device 102 is either a long way from the network device 104 and subject to signal fading, that there is interference from other sources, or that there is packet loss caused by fading or network collisions.

Figure 11:
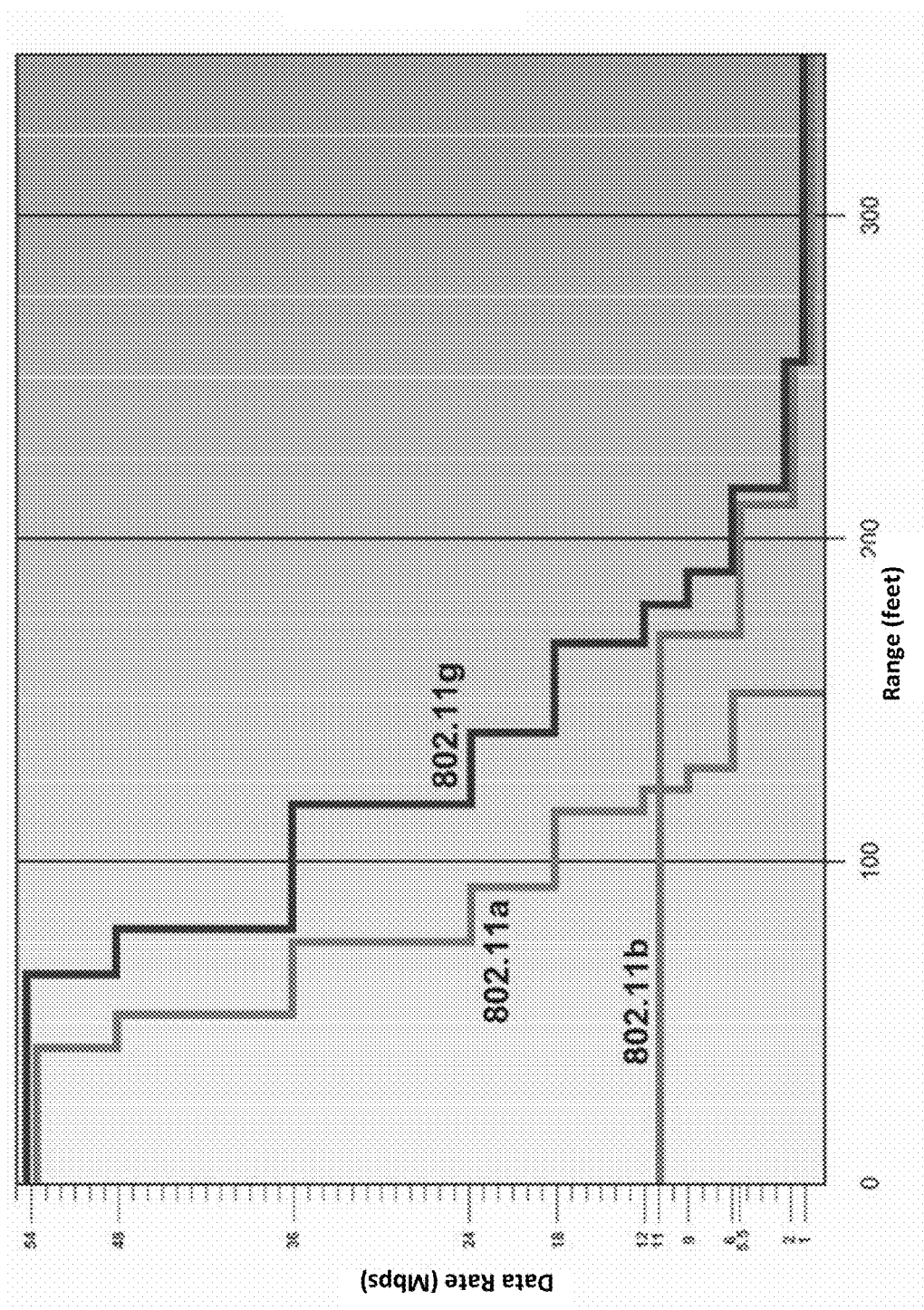
FIG. 11 is a graph of Wi-Fi 802.11 range vs. rate curves for different Wi-Fi technologies in some embodiments.

In various embodiments, the resulting rates vs. range graphs may follow the format in FIG. 11, which is a study of range vs. rate for varies Wi-Fi technologies, or "PHYs", from Broadcom 802.11g marketing material.

In some embodiments, the Link Maximum, the link speed that is considered acceptable quality, has a value of 10 Mbs. As a result, any link speed greater that 10 will score the maximum link score—for a link weight of 0.4, this would result in a link score of 0.4.

Figure 12:
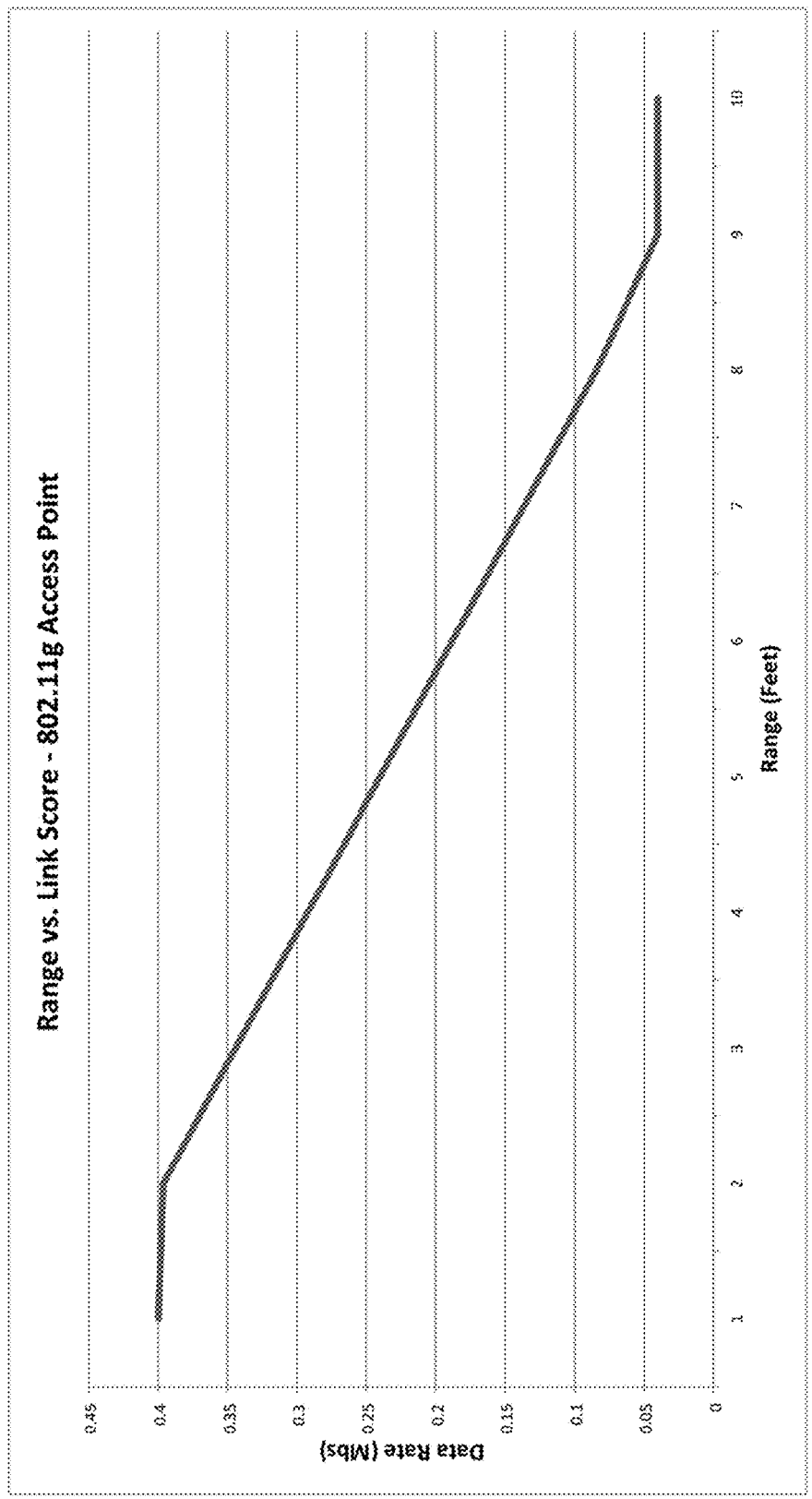
FIG. 12 is a graph of link score vs. range from an access point (e.g., network device) in some embodiments.

Using the rate vs. range plot in FIG. 12, the link module may derive the link score as a function of the distance from the access point bounded by 160 to 250 feet as:

Data Rate=−0.13*Range+32

Where Data Rate is in Mbs, and Range is in feet.

So, in some embodiments, link score=(−0.13*Range+32)/Link Maximum which is plotted in FIG. 12, showing both data rate and link score for Link Maximum=10 Mbs, and the link weight of 0.4.

In various embodiments, the link module 208 calculates a degrading score value once a mobile device 102 moves into a marginal signal area where the non-cellular wireless data network 106 data rate falls below 10 Mbs (when link maximum=10) and when, for example with an 802.11g network, the distance from the network device 104 >~160 ft in an unrestricted environment. Note the range window presented herein may change depending on the 802.11 PHY (i.e., b/g/n/ac).

Those skilled in the art will appreciate that a different link maximum may be utilized based, in part, on the Wi-Fi PHY (i.e., b/g/n/ac). In some embodiments, the link module 208 may assess the non-cellular wireless data network 106 to determine the Wi-Fi PHY in order to determine a link maximum. In one example, the link module 208 receives information regarding the Wi-Fi PHY from an operating system or an agent on the mobile device 102.

FIG. 11 is a graph of Wi-Fi 802.11 range vs. rate curves for different Wi-Fi technologies in some embodiments.

FIG. 12 is a graph of 802.11 data rate and link score vs. range from an access point (e.g., network device 104) in some embodiments.

Figure 13:
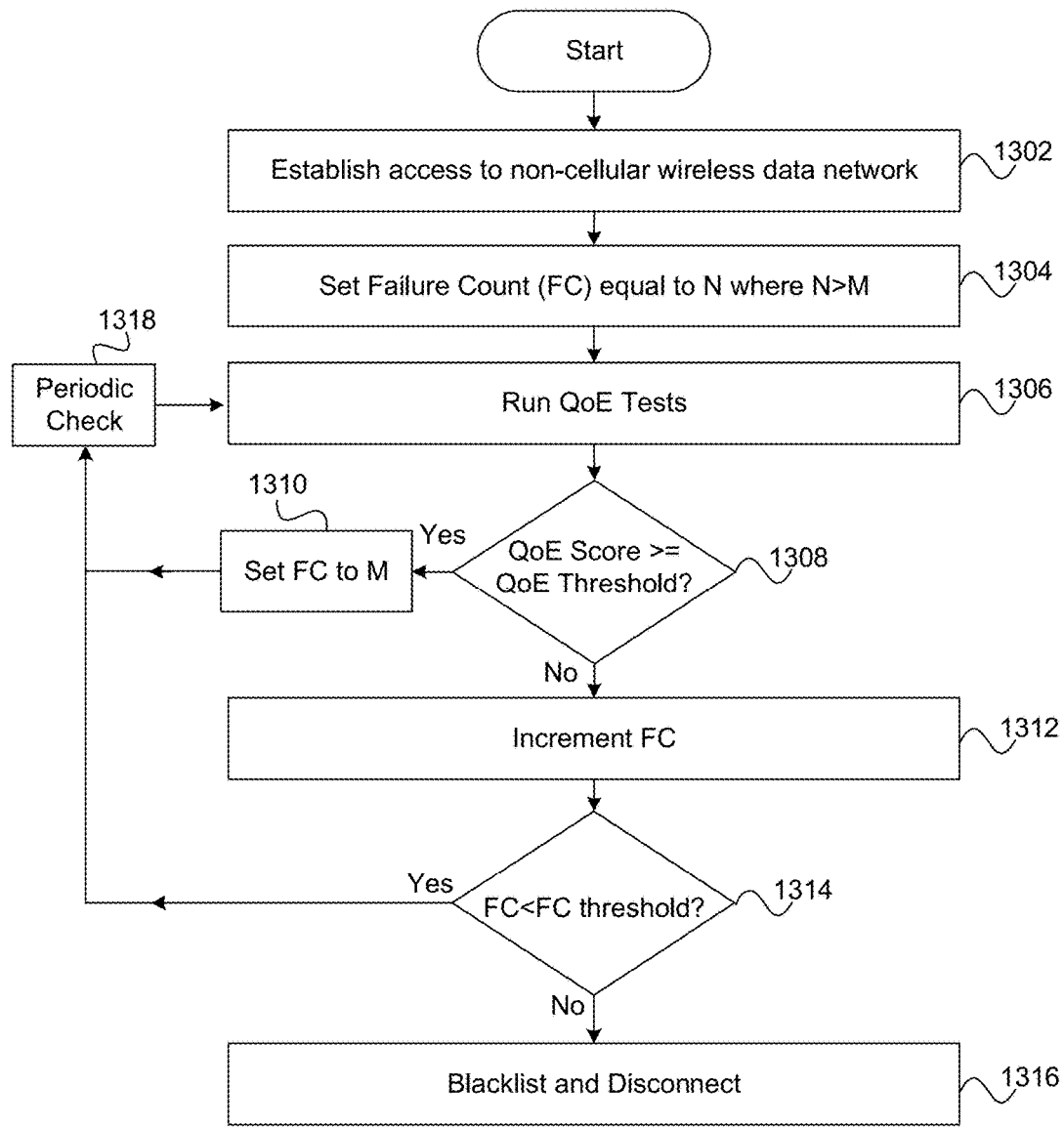
FIG. 13 is a flowchart for adjusting a QoE threshold and blacklisting a non-cellular wireless data network when a failure count exceeds a failure count threshold in some embodiments.

FIG. 13 is a flowchart for adjusting a QoE threshold and blacklisting a non-cellular wireless data network 106 when a failure count exceeds a failure count threshold in some embodiments. In step 1302, a mobile device 102 establishes access over a non-cellular wireless data network 106 with a network device 104 to access a communication network 110. In one example, the scan module 202 of a mobile device 102 scans an area for a network device 104. The authentication module 204 may retrieve network credentials or a user may provide network credentials to the network device 104. Based on the network credentials, the network device 104 may provide permission for the mobile device 102 to access the communication network 110.

In step 1304, the FC module 216 sets a failure count to N where N is greater than M. In one example, N is an initial failure count and M is an adjusted failure count after a predetermined number of tests indicating sufficient quality. In one example, where N=5 then if there are five consecutive quality failures, the mobile device 102 may terminate the connection with the network device 104 and/or the non-cellular wireless data network 106. Further, the mobile device 102 may disconnect from the network device 104 and/or the non-cellular wireless data network 106.

In step 1306, the QoE score module 210 may run QoE tests. In one example, the ping module 206 may calculate a ping score and the link module 208 may calculate a link score as described herein. The QoE score module 210 may then calculate the QoE score based on the ping score and/or the link score.

In step 1308, the QoE score module 210 may compare the QoE score with the QoE threshold. If the QoE score calculated in step 1206 is of sufficient quality (e.g., the QoE score is equal to or greater than the QoE threshold) then the failure count adjustment module 218 may set the failure count to M. Those skilled in the art will appreciate that the QoE score may be compared to the QoE threshold in any number of ways to determine a quality of communication. If the QoE score calculated in step 1306 is not of sufficient quality (e.g., the QoE score is less than the QoE threshold) then the failure count module 216 may change (e.g., increment) the failure count in step 1312.

In step 1314, the failure count module 216 may compare the failure count to the failure count threshold (e.g., the failure count module 216 may determine if a number of failures exceed the failure count threshold). If the quality of communication has failed over a predetermined period of times (e.g., the failure count meets or exceeds the thresholds), the network response module 220 may blacklist the network device 104 and/or the non-cellular wireless data network 106. The network response module 220 may also disconnect the mobile device 102 from the network device 104 and/or the non-cellular wireless data network 106.

If the QoE score indicates sufficient quality in step 1308 and/or the failure count indicates that there have not been sufficient failures to disconnect the mobile device 102, then the QoE score module 210 may wait a predetermined period of time (e.g., 1 minute) in step 1318 before running the QoE tests again in step 1306.

In various embodiments, the "blacklisting" of a non-cellular wireless data network 106 is limited to the mobile device 102 that was previously communicating over the non-cellular wireless data network 106 (i.e., other mobile devices that use or may use the same non-cellular wireless data network 106 may be unaffected by the "blacklist" determination). In some embodiments, a "blacklist" determination may be shared with a server (e.g., cached until a network connection is made and then provided to the server). In some embodiments, the server is a curation server. The server may track the "blacklist" determination and take a number of "blacklist" determinations by any number of mobile devices into account before determining to recommend the related non-cellular wireless data network 106 (or determining to not recommend the related non-cellular wireless data network 106). In some embodiments, the QoE score is shared with a server so the server can calculate the average quality of the non-cellular network (e.g., quality of the non-cellular wireless data network 106 and/or communication network 110) from a plurality of measurements. In one embodiment this server is the QoE system 108. In another embodiment this server is a curation server. The curation server is further described by U.S. patent Ser. No. 13/396,552, entitled "Systems and Methods for Network Curation," filed Feb. 14, 2012, which is incorporated by reference herein.

Figure 14:
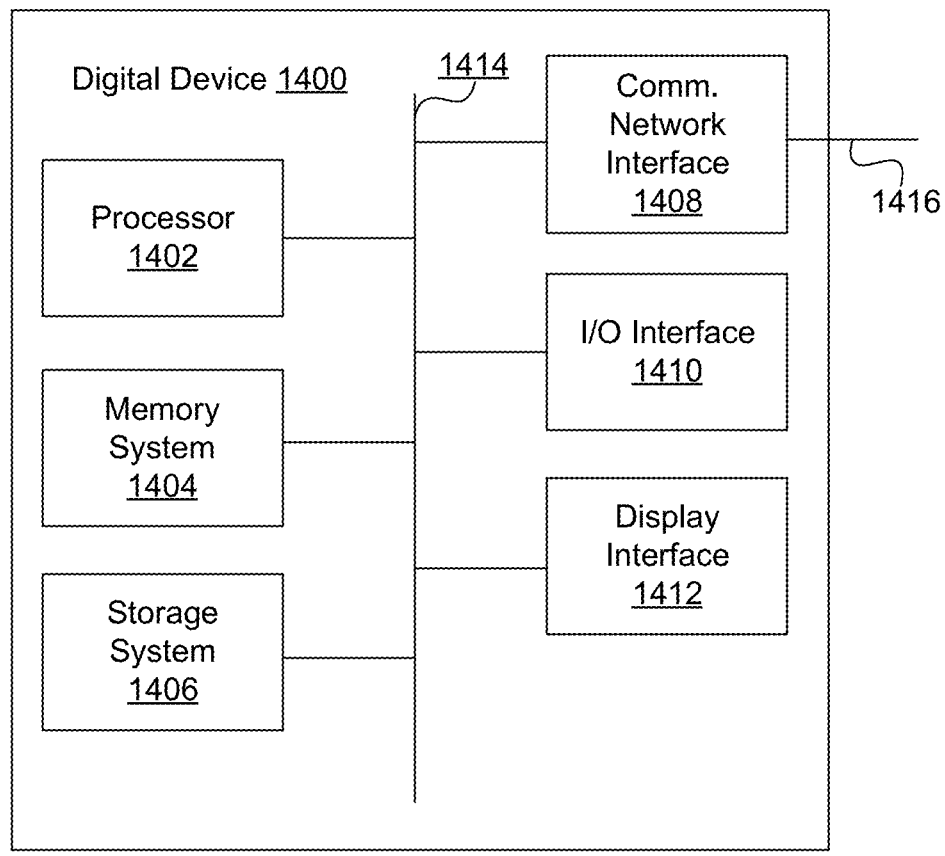
FIG. 14 is a block diagram of an exemplary digital device.

FIG. 14 is a block diagram of an exemplary digital device. The credential server 116 comprises a processor 1400, a memory system 1402, a storage system 1404, an I/O interface 1406, a communication network interface 1408, and a display interface 1410. The processor 1400 is configured to execute executable instructions (e.g., programs). In some embodiments, the processor 1400 comprises circuitry or any processor capable of processing the executable instructions.

The memory system 1402 is any memory configured to store data. Some examples of the memory system 1402 are storage devices, such as RAM or ROM. The memory system 1402 can comprise the ram cache. In various embodiments, data is stored within the memory system 1402. The data within the memory system 1402 may be cleared or ultimately transferred to the storage system 1404.

The storage system 1404 is any storage configured to retrieve and store data. Some examples of the storage system 1404 are flash drives, hard drives, optical drives, and/or magnetic tape. In some embodiments, the credential server 116 includes a memory system 1402 in the form of RAM and a storage system 1404 in the form of flash data. The storage system 1404 may comprise nontransitory computer readable media that may store instructions executable by a processor. Both the memory system 1402 and the storage system 1404 comprise computer readable media which may store instructions or programs that are executable by a computer processor including the processor 1400.

The optional input/output (I/O) interface 1406 is any device that receives input from the user and output data. The optional display interface 1410 is any device that is configured to output graphics and data to a display. In one example, the display interface 1410 is a graphics adapter. It will be appreciated that not all digital devices 102 comprise either the I/O interface 1406 or the display interface 1410.

The communication network interface (com. network interface) 1408 can be coupled to a network via the link 1412. In various embodiments, the communication network interface 1408 comprises two antennas including a first antenna to communicate over a cellular wireless network 114 and a second antenna to communicate over a non-cellular wireless data network 106. The communication network interface 1408 may support communication over an Ethernet connection, a serial connection, a parallel connection, or an ATA connection, for example. The communication network interface 1408 may also support wireless communication (e.g., 802.11 a/b/g/n, WiMax). It will be apparent to those skilled in the art that the communication network interface 1408 can support many wired and wireless standards. The communication network interface 1408 may also support communication over a cellular wireless network 114 (e.g., the communication network interface 1408 may support communication over LTE, 3G, Wimax, or the like).

Some embodiments described herein include methods for determining whether to switch a mobile device from a current cellular data network to an available Wi-Fi network, and vice versa, while also, for example, preventing and/or reducing (i) user interruption (e.g., during a VoIP call), (ii) rapid sequential network switching (e.g., because both networks are of comparable quality), and (iii) unnecessary battery drain. In various embodiments, the system measures cellular and Wi-Fi signal quality, measured available network bandwidth, packet timings, packet loss, link speed, and the like. These measurements may be converted into various scores (e.g., ping score, overall network score, etc.) which may also be individually weighted (e.g., based on user and/or carrier preference for a Wi-Fi connection or a cellular connection). This may be particularly beneficial to carriers preferring to have their subscribers moved over to a Wi-Fi connection whenever possible, e.g., to save bandwidth. Similarly, users (e.g., subscribers) may also find this beneficial in order to reduce their own cellular data usage, which is often expensive and/or capped by their carrier.

Figure 15:
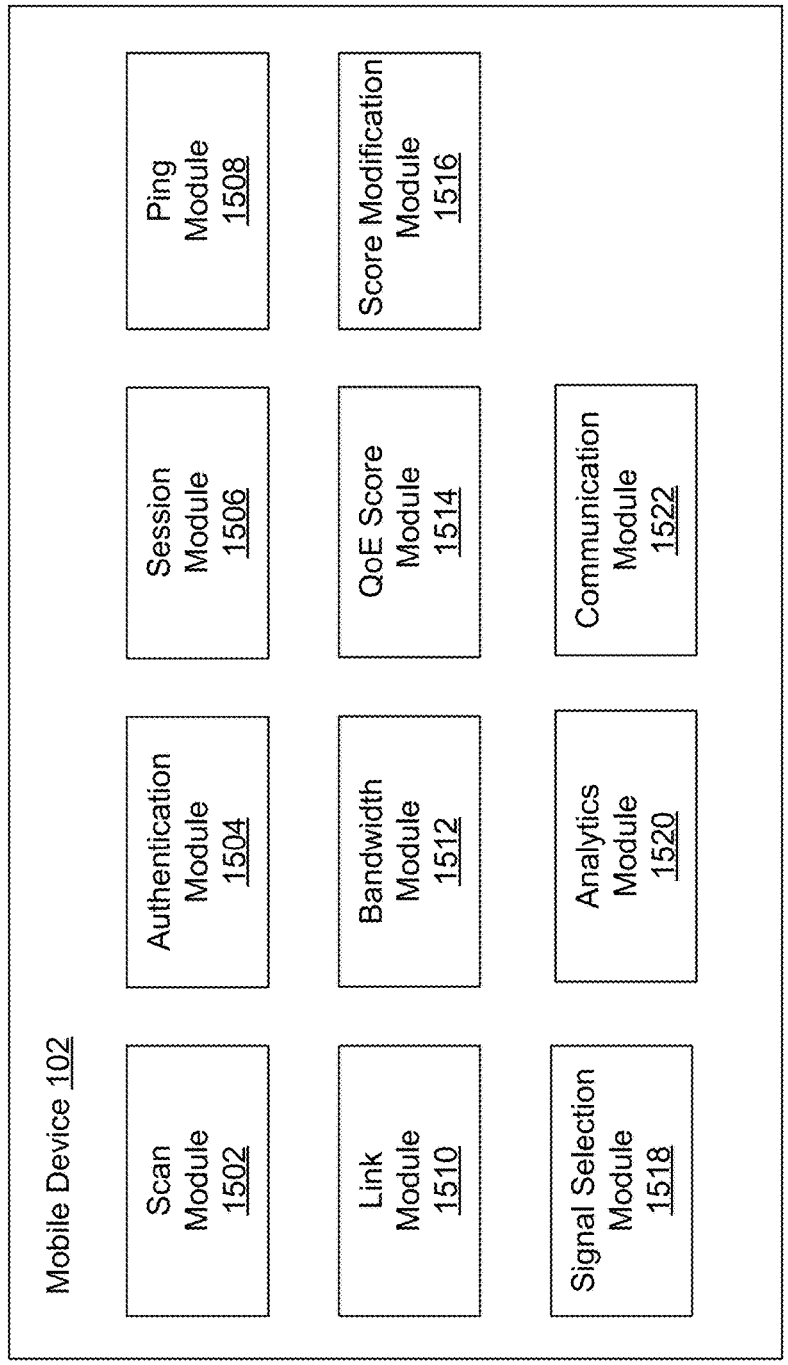
FIG. 15 is a block diagram of a mobile device according to some embodiments.

FIG. 15 is a block diagram of a mobile device 102 according to some embodiments. In some embodiments, the digital device 1502 comprises a scan module 1502, an authentication module 1504, a session module 1506, a ping module 1508, a link module 1510, a bandwidth module 1512, a QoE score module 1514, a score modification module 1516, a signal selection module 1518, an analytics module 1520, and a communication module 1522.

The scan module 1502 may scan an area for available cellular data networks, such as cellular data network 114 (see FIG. 1), and available Wi-Fi data networks, such as Wi-Fi data network 106 (see FIG. 1). In one example, the scan module 1502 scans an area for wireless access points (e.g., hotspots) or any other network devices such as the network device 104 or the cellular tower 112. The scan module 1502 may receive network identifiers from the wireless data networks 106, 114 and/or from associated hardware, e.g., network device 104 and cellular tower 114. The network identifiers may identify the various networks and/or the associated hardware. In various embodiments, the scan module 1502 may be a part of an operating system of the mobile device 102.

The authentication module 1504 may be configured to obtain permission from the network device 104 to access the communication network 110. In some embodiments, the authentication module 1504 receives a username, password, and/or other information (e.g., acceptance of terms and conditions) from a user of the mobile device 102 and provides all or some of the information to the network device 104 to obtain permission to access the communication network 110.

In some embodiments, as discussed herein, the authentication module 1504 provides a credential request to a credential server over an open port of a network device 104, receives a credential request response from the credential server via the open port of the network device 104, retrieves network credentials from the credential request response, and provides the network credentials to the network device 104 to obtain permission to access the communication network 110.

Active Session

The session module 1506 may be configured to determine whether the mobile device 102 is actively using a network (e.g., during a VoIP call, streaming media, and the like). This may help prevent, for example, switching from a cellular network to a Wi-Fi network, or vice versa, when the mobile device 102 is in active network use, thereby preventing interruption of a streaming media session, a VoIP call, and so forth.

In some embodiments, the session module 1506 may determine a current data usage rate (e.g., 1 Mb/s) of the mobile device 102, whether connected to a Wi-Fi network (e.g., network 106) or a cellular network (e.g., network 114), and compare the current data usage rate against one or more predetermined usage thresholds (e.g., 1.5 Mb/s). The usage threshold(s) may be predetermined by a user of the mobile device 102 and/or a carrier of the cellular and/or Wi-Fi networks. The session module 1506 may compare the current data usage rate against the one or more predetermined usage threshold to determine whether the mobile device 102 is actively in use.

For example, if a mobile device 102 is currently utilizing a network service at a current data usage rate (e.g., 0.5 Mb/s) and that current data usage rate is below a usage threshold (e.g., 1.5 Mb/s), the session module 1506 may determine the mobile device 102 is not in active network use. Accordingly, the mobile device 102 may be available to switch networks without interrupting user activity (e.g., without interrupting media streaming). Similarly, if a mobile device 102 is currently utilizing a network service at a current data usage rate (e.g., 2 Mb/s), and the current data rate is above the usage threshold (e.g., 1.5 Mb/s), the session module 1506 may determine the mobile device 102 is in active network use, and prevent the mobile device 102 from switching to another network, even if another network may provide an improved connection.

In some embodiments, when the session module 1506 determines that the mobile device 102 is not in active network use, the mobile device 102 may measure a quality of available Wi-Fi and/or cellular network connections. The session module 1506 may perform the measurement as a background activity on the mobile device 102. The mobile device may enable a background mode to allow an application to route traffic over a Wi-Fi network, while leaving the remainder of the system on the current cellular carrier. In some embodiments, the mobile device 102, in a background mode, may take measurements of available Wi-Fi and/or cellular data networks.

Ping Score

The ping module 1508 may transmit a plurality of pings to a server (e.g., the QoE system 108) over the communication network 110, receive a set of ping responses, and calculate a ping score. In one example, the ping module 1508 transmits the pings to the QoE system 108 on the communication network 110 using the communication module 1524. The QoE system 108 may provide a set of ping responses back to the mobile device 102. Each ping response may be measured to determine a ping time (e.g., a roundtrip time) and/or packet loss. In various embodiments, the QoE system 108 is or comprises an echo server.

The ping module 1508 may calculate a ping score based on the transmission of plurality of pings and the set of ping responses. The ping module 1506 may calculate the ping score in any number of ways.

In some embodiments, the ping module 1508 determines an average of the ping times from the set of ping responses (e.g., a time average based on timestamps). The ping module 1508 may further determine a standard deviation from the set of ping responses (e.g., a standard deviation based on timestamps). The ping module 1508 may also identify the number of pings transmitted (e.g., packets sent) as well as the number of ping responses received (e.g., packets received).

Figure 23:
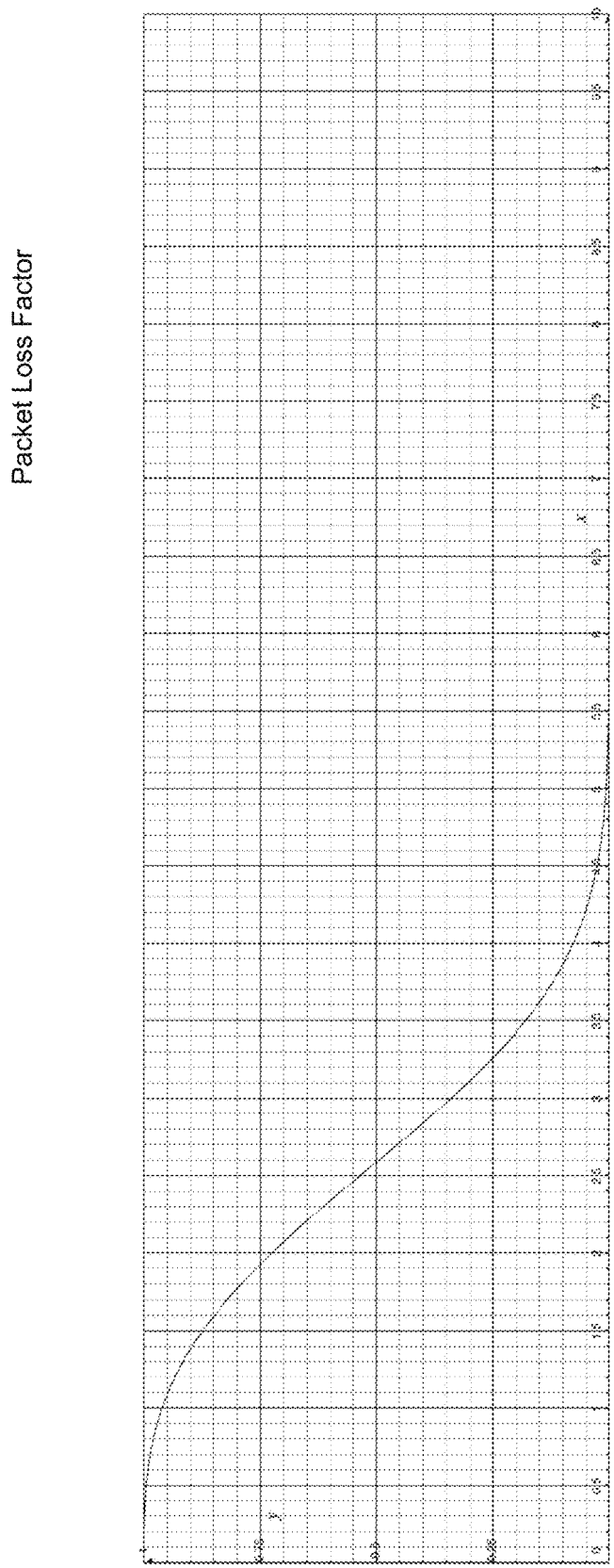
FIG. 23 is an example graph showing a curve of an example function to calculate packet loss according to some embodiments.

Ping times may be calculated using the following expression:

$a = \mathrm{MAX}((1-(\mathit{STDDEV}(\mathrm{times})/\mathrm{AVERAGE}(\mathrm{times})), 0.0)$ Packet loss may be calculated using the following expression (the associated graph is shown in FIG. 23):

$b = e^{-(dropped^3)}/100$

Accordingly, the ping score may be calculated by the following:

$\mathrm{score} = a \ast b$

In some embodiments, a ping score may be calculated as follows:

Ping Score=(1−(standard deviation/ping average))* (packets received/packets sent)

In various embodiments, the ping score may be weighted by multiplying the ping score with a ping weight. In one example, after testing the ping score calculations, a ping weight of 0.6 may be used. It will be appreciated that any ping weight may be used.

It will be appreciated that the calculation of the ping standard deviation divided by the ping average may remove at least some variations in ping times which may be caused by fixed network latency based on the location of the mobile device 102 relative to the QoE system 108 (e.g., relative to the data center hosting the QoE system 108).

Default Value for Ping Score

In some embodiments, a default bandwidth score may be used, e.g. in the event that measured values are not available. For example, the default value may be 1.0 (assuming a normalized range of 0.0-1.0, as discussed herein). A default value may be used, for example, when pings are not returned during a ping test (e.g., when the server is currently blocked from receiving ping requests, when the server is not accepting ping requests, and so forth). In some embodiments, the default value may have a different value (e.g., 0.5) and/or be adjustable.

The link module 1510 may determine a quality of a connection with a Wi-Fi network and/or a cellular data network by calculating a link score for the Wi-Fi connection and/or a signal score for the cellular data network connection. In some embodiments, the link score may be based on one more measured link speeds (e.g., 1 Mb/s, 2.5 Mb/s, and so forth). A signal score may be based, for example, on an RSRQ (reference signal receive quality) value.

Wi-Fi Link Score

Link speed may be related to packet loss, signal fading and SINR (signal to interference and noise ratio). The link speed may also be related to the distance between the mobile device 102 and the network device 104 based on range vs. rate algorithms. Any range vs. rate algorithms including those in the IEEE 802.11 standards may be utilized.

In some embodiments, the link module 1510 may determine a current link speed of one or more connected Wi-Fi networks, such as 1 Mb/s, 2 Mb/s, 30 Mb/s and so forth. In some embodiments, the link module 1510 may retrieve link speeds from a network device (e.g., network device 104) upon joining the network and/or at various intervals while the mobile device is connected to the network. The link module 1510 may then normalize that link speed value to a predetermined range (e.g., 0.0-1.0) in order to, for example, facilitate comparison between different carrier types (e.g., cellular and Wi-Fi). In some embodiments, a maximum speed threshold may be set (e.g., 10 Mb/s). Any link speeds above this threshold may still only translate to the maximum value within the predetermined range (e.g., 1.0) since it may be assumed that a connection with a link speed above the maximum threshold is unlikely to be a limiting factor in the overall quality of experience for the user.

In some embodiments, the following equations may be used by the link module 1510 to calculate the link score based on a normalized predetermined range of (0.0-1.0):

$\mathrm{score} = 1 - (2^{(-0.25 \ast linkspeed)})$      1)

$\mathrm{score} = 1 - (e^{(-0.17 \ast linkspeed)})$      2)

Figure 25:
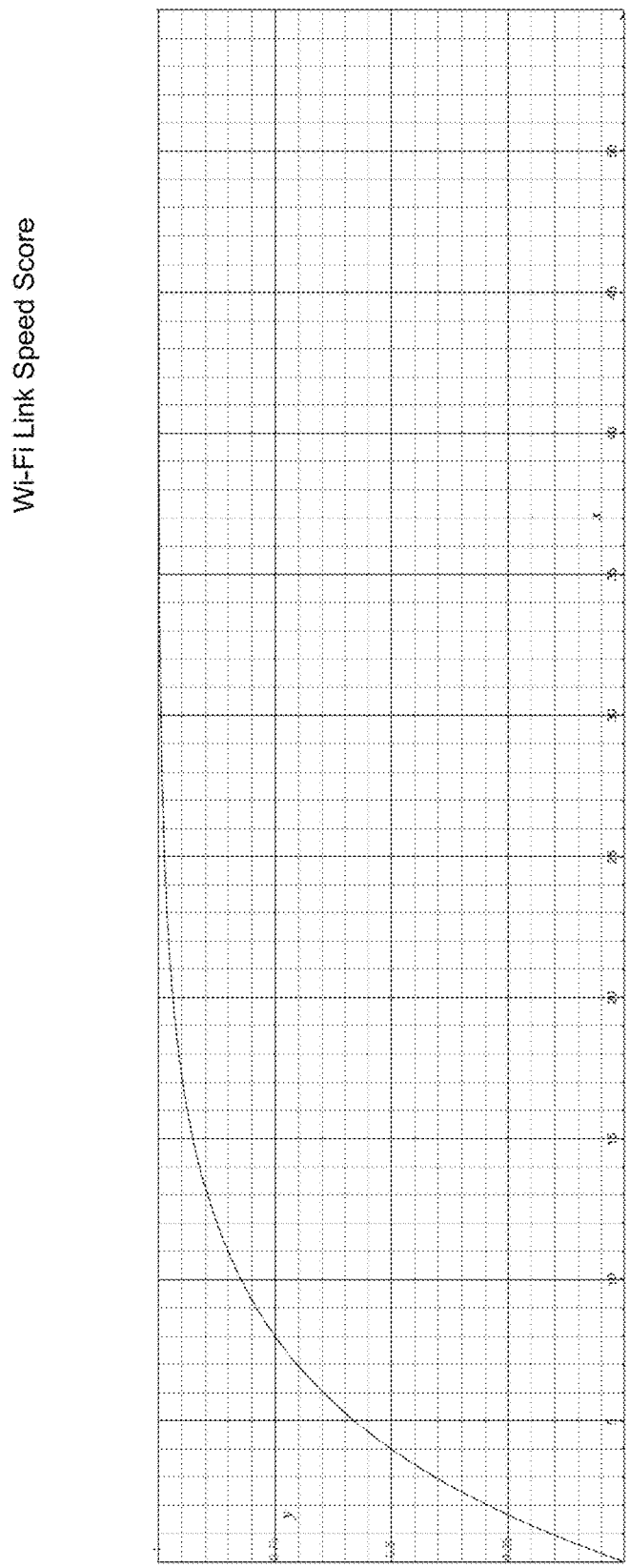
FIG. 25 is an example graph showing a curve of an example function for normalizing a link speed value to a link score according to some embodiments.

An example graph illustrating link score calculation can be found in FIG. 25.

In some embodiments, the link score may be calculated without an active connection to the Wi-Fi data network. For example, the link score may be based on a Wi-Fi signal strength (e.g., a current RSSI value for the network).

In some embodiments, the link module 1510 may determine a link maximum in addition to the link speed. The link speed may be the maximum data rate of the link and may be determined by various rate adaption algorithms which base the resulting data rate value on packet loss, signal fading and/or RF SINR. The link maximum may be the maximum expected link speed.

In some embodiments, the link score may be calculated as follows:

Link Score=minimum((link speed/link maximum), 1.0)

Where 'minimum' may mean, for example, the lower value of either 1 or a result of link speed divided by link maximum.

In various embodiments, the link score may be weighted by a multiplying the link score with a link weight. In some examples, after testing the link calculations, a link weight of 0.4 may be used. It will be appreciated that any ping weight may be used.

Cellular Signal Score

In some embodiments, the link module 1510 may determine a signal strength and/or signal quality of an associated cellular data network (e.g., network 114) connection. This may comprise one or more RSRQ values. The module 1510 may generate a signal score using the RSRQ values and/or by normalizing the RSRQ value(s) to a predetermined range (e.g., 0.0-1.0). Normalization may, for example, assist with comparison to other network types (e.g., Wi-Fi).

Figure 24:
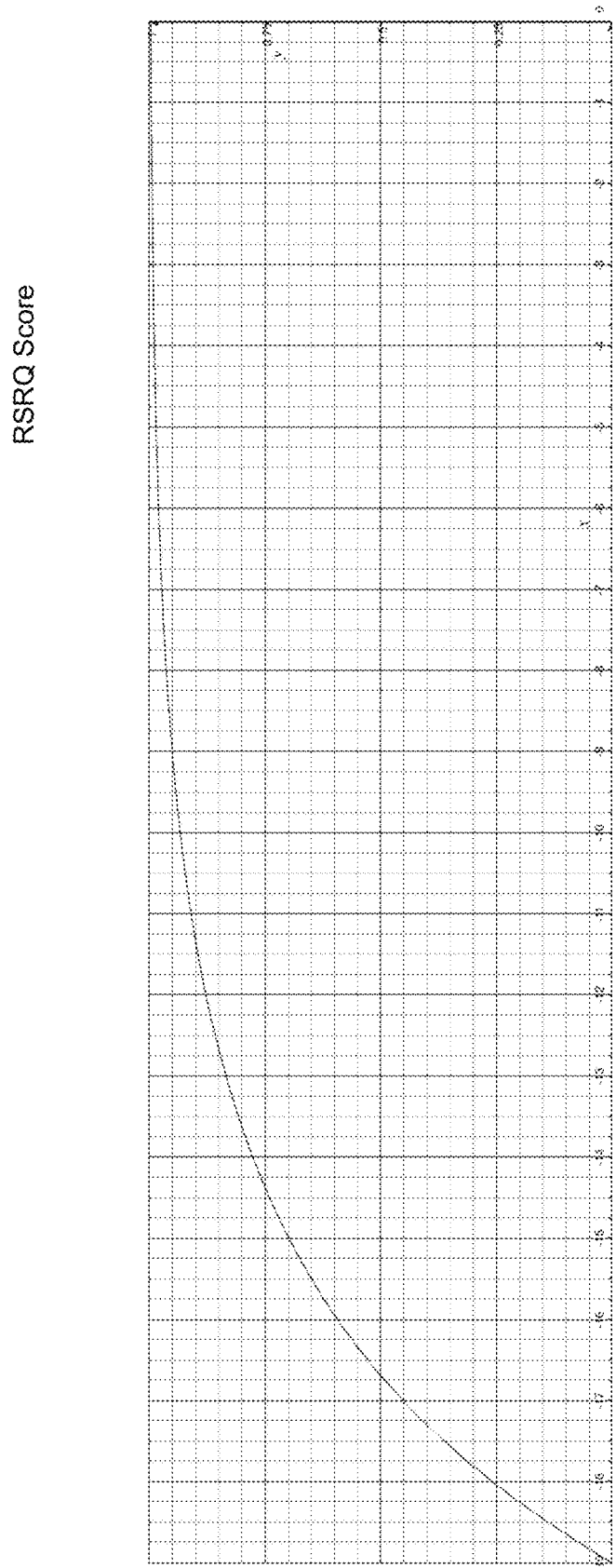
FIG. 24 is an example graph showing a curve of an example formula for calculating a signal score based on RSRQ values according to some embodiments.

For example, given a range of −3 through −19 (e.g., an example expected range for an LTE network connection), where by around −10.5 the network connection may be starting to deteriorate, the curve shown in FIG. 24 provides a mapping of RSRQ to a signal score in the range 0.0 through 1.0. The formula for this curve is:

$$score=1-(e^{(-0.3*(RSRQ+19))})$$

Wi-Fi Signal Scores

In some embodiments, the link module 1510, or the signal selection module 1518 (discussed herein), may calculate a Wi-Fi signal score of a currently connected Wi-Fi network or an available Wi-Fi network. For example, the Wi-Fi signal score may be based on one or more current RSSI values associated with the Wi-Fi network. In some embodiments, the Wi-Fi signal score may be the RSSI value(s) itself, or it may be the RSSI value(s) normalized to a predetermined range (e.g., 0.0-1.0). The Wi-Fi signal score may be helpful, for example, when selecting from among multiple available Wi-Fi networks. Additionally, the Wi-Fi signal score may be used as a threshold determination when determining whether the digital device 102 may be eligible to switch from a currently selected cellular network to a Wi-Fi network (e.g., in order to prevent potentially switching to a bad Wi-Fi network).

Default Values

In some embodiments, a default link score and/or default signal score may be used in the event an actual link speed and/or RSRQ value(s) cannot be obtained. For example, the default value may be 1.0 (assuming a range of 0.0-1.0, as discussed above). In some embodiments, the default value may have a different value (e.g., 0.5) and/or be adjustable.

Bandwidth Score

The bandwidth module 1512 may calculate a bandwidth score based on a measured available bandwidth for associated cellular and/or Wi-Fi data networks. In some embodiments, the bandwidth module 1512 may measure an available bandwidth by calculating a difference in average round trip time for large and small message requests (e.g., UDP echo requests).

As with the link speed, as the bandwidth increases above a certain point, the improvement in the quality of experience may be negligible for many purposes. In one example, that point may be around 2 Mb/s which is typically sufficient to successfully stream HD video. An example graph, based on these example parameters, showing a curve that may convert a measured bandwidth in Mb/s to a bandwidth score can be found in FIG. 25. The example equation for the curve is:

$$score=1-(2^{(-3*bandwidth)})$$

As with the link speed equation, there is a similar equation using Euler's constant:

$$score=1-(e^{(-2.1*bandwidth)})$$

Default Values

In some embodiments, a default bandwidth score may be used in the event that measured values are not available. For example, the default value may be 1.0 (assuming a range of 0.0-1.0, as discussed herein). In some embodiments, the default value may have a different value (e.g., 0.5) and/or be adjustable.

Overall Network Scores (or "QoE" Scores)

The QoE score module 1514 may calculate a Wi-Fi network score to determine whether, in some embodiments, communication between the mobile device 102 and with devices over the data network 106, network device 104 and communication network 110 is of sufficient quality. Similarly, the QoE score module 1514 may calculate a cellular (e.g., LTE) network score to determine whether, in some embodiments, communication between the mobile device 102 and with devices over the data network 114, network device 112 and communication network 116 is of sufficient quality. It will be appreciated that for discussion purposes, the Wi-Fi and cellular network scores may also be referred to as "overall network scores" or "QoE scores."

In some embodiments, the QoE score module 1514 may determine a quality of a cellular network connection and/or a Wi-Fi network connection based on associated link scores, signal scores, ping scores, and/or bandwidth scores.

For example, an overall network score for a Wi-Fi connection may be calculated as follows:

Overall Wi-Fi Network Score=Link Score*Ping Score*Bandwidth.

An overall network score for a cellular connection may be calculated as follows:

Overall Cellular Network Score=Signal Score*Bandwidth score.

In some embodiments, the overall cellular network score may be calculated using a ping score of the cellular data network in addition to the signal score and the bandwidth score. For example, ping module 1508 may determine a signal strength of the cellular data network, and normalize that signal strength to calculate a ping score for the cellular data network. An overall network score for a cellular connection may be calculated as follows:

Overall Cellular Network Score=Signal Score*Bandwidth score*Ping Score.

In some embodiments, the QoE score module 1514 may define and/or compare any of the aforementioned scores and values (e.g., bandwidth score, link score, signal score, ping score overall network score) to one or more associated thresholds in order to assist with determining whether the mobile device 102 should stay on the currently selected network (e.g., network 114), or switch to another network (e.g., network 106). Example threshold values (which may also be referred to as "QoE" threshold values) include the following:

1) Overall Cellular to Wi-Fi Network Score Threshold: If the overall Wi-Fi network score exceeds the overall cellular network score by at least this threshold value, then the mobile device 102 may switch from a currently selected cellular data network to the Wi-Fi data network. In some embodiments, this threshold value may actually be 0, thereby indicating that the device 102 should switch to the Wi-Fi network even if the overall scores are the same. In some embodiments, this threshold value may actually be a negative value, thereby indicating that the device 102 should switch to the Wi-Fi network even if may offer a lower quality connection than the currently selected cellular connection.

2) Overall Wi-Fi to Cellular Network Score Threshold: If the overall cellular network score exceeds the Wi-Fi network score by at least this threshold value, then the mobile device 102 may switch from a currently selected Wi-Fi network to a cellular network. In some embodiments, this threshold value may actually be 0, thereby indicating that the device 102 should switch to the cellular network even if the overall scores are the same. In some embodiments, this threshold value may actually be a negative value, thereby indicating that the device 102 should switch to the cellular network even if it may offer a lower quality connection than the currently selected Wi-Fi network.

3) Wi-Fi Bandwidth Score Threshold: If a Wi-Fi bandwidth score value exceeds this threshold, the mobile device 102 may be eligible to switch from a currently selected cellular data network to the Wi-Fi network.

4) Cellular Bandwidth Score Threshold: If a cellular bandwidth score value exceeds this threshold, the mobile device 102 may be eligible to switch from a currently selected Wi-Fi data network to an available cellular network.

5) Bandwidth Differential Threshold: If a bandwidth score of a currently selected network is below a bandwidth score of another available network by at least this threshold value, then the device 102 may be eligible to switch to that available network.

6) First Wi-Fi Signal Score Threshold: If a Wi-Fi signal score value (e.g., an RSSI value, or a normalized score based on that value) exceeds this threshold, the mobile device 102 may be eligible to switch from a currently selected cellular data network to the Wi-Fi network.

7) Second Wi-Fi Signal Score Threshold: In some embodiments, if a second Wi-Fi signal score value of a currently selected Wi-Fi network is below this threshold value, the mobile device 102 may automatically switch to an eligible cellular data network.

8) Active Session Threshold: If the data rate usage of the currently selected network exceeds this threshold value, then it may be assumed that the device 102 is in "active" network use.

9) Quality Threshold: If an overall network score for the currently selected network is below this threshold, then the QoE score module 1514 may determine that the selected network is of insufficient quality and, in some embodiments, prompt the device 102 to search for other available networks.

As indicated herein, it will be appreciated that measured and estimated values, as well as score values and/or threshold values, may be normalized to a predetermined range, such as 0 to 1 (floating point values). This may, for example, create score values and/or threshold values which can be directly compared across heterogeneous network bearers (or "carriers"). In some embodiments, the conversion from a native measurement to a normalized component may occur by applying different curves (e.g., as discussed herein).

In other embodiments, the QoE score module 1514 may calculate a QoE score based on the ping score. In some embodiments, the QoE score module 1514 may calculate the QoE score based on the ping score and the link score. For example, the QoE score may be calculated as follows:

$$\text{QoE Score} = \text{minimum}((\text{ping score} + \text{link score})/(\text{ping weight} + \text{link weight}), 1.0)$$

If there is no ping weight or link weight, the ping weight+link weight may be assumed to be equal to 1 (one). In various embodiments, the ping score and the link score are summed together. The ping score and the link score may be a part of a function and not necessarily added together. In some embodiments, the QoE score is based, in part, on multiplying the ping score with the link score instead of summing the two values. Those skilled in the art will appreciate that the QoE score may be determined in any number of ways.

In some embodiments, the QoE score may yield a score between 0 and 1 with, for example, 1 indicating a very good score. The QoE score maybe used to determine a quality of the network.

In another embodiment the ping score and link score are not combined to create one QoE score but rather represent two separate QoE scores with two separate thresholds. In one example, the digital device can be configured to require one or both QoE thresholds to be satisfied to continue the use of the Wi-Fi data network 106.

Weighting and Hysteresis

A score modification module 1516 may modify (e.g., add value to a score or threshold, subtract value to a score or threshold, and/or multiply a score or threshold by a weighting factor) a variety of scores and/or threshold values, including those discussed herein (e.g., Wi-Fi network score, cellular network score, ping score, link score, bandwidth score, data usage rate threshold, and so forth). For example, a user of the mobile device 102 or network carrier may select between preferring a cellular network connection, a Wi-Fi network connection, or the best available connection (i.e., with no preference between cellular or Wi-Fi). The score modification module 1516 may then subsequently modify any of the associated scores and/or threshold values, such as the Wi-Fi network score, in the event a user has selected to prefer Wi-Fi network connections.

For example, the modification module 1516 may add a predetermined modification value (e.g., 0.1) or apply a multiplication factor (e.g., 1.1) to a score (e.g., an overall Wi-Fi network score) and/or threshold value. It will be appreciated that the predetermined modification value and/or multiplication factor may be set by a user and/or network carrier in various embodiments. The value range (e.g., 0.0-1.0) of the modification value and/or the multiplication factor may be based on the normalized range (e.g., 0.0-1.0) of the scores and/or threshold values to provide accurate score and threshold modification.

In some embodiments, the modification module 1516 may add a predetermined "bonus" value to a score that is associated with a recently joined network. This "bonus" value may assist in preventing network switching which can both drain battery life of the mobile device 102 and potentially be disruptive to the user. For example, a value of 0.1, assuming a range of 0.0-1.0, may be added to a score associated with a recently joined network. In another example, a predetermined "bonus" value may be added to a threshold after switching to a network to prevent network switching. Accordingly, even if another network may offer improved quality, the mobile device 102 may nonetheless remain on the currently selected network. In some embodiments, a multiplication factor may be used instead of a flat bonus.

It will be appreciated that the "bonus" value may change over time. For example, after a predetermined period of time, the "bonus" value may be removed entirely. In one example, the recently joined network bonus may be automatically removed after 30 minutes, or other predetermined amount of time. In another example, over the predetermined period of time, the "bonus" value may diminish.

In some embodiments, the modification module 1516 may modify the various scores and/or thresholds in response to input received from a user, e.g., via GUI 2100 shown in FIG. 21, discussed below.

In some embodiments, the modification module 1516 may adjust a threshold based on the quality of the cellular wireless network 114. For example, if the cellular wireless network 114 is an LTE network, which typically offer high performance, the modification module may adjust the threshold to require higher quality connectivity so the user may receive comparable Wi-Fi performance to that of the cellular wireless network 114. In another example, if the cellular wireless network 114 is of low speed or quality, the modification module 1516 may adjust the threshold to allow for lower quality connectivity.

The optional signal selection module 1518 may be configured to select a network (e.g., one or more Wi-Fi data networks 106 or cellular wireless network 114) based on the quality of the Wi-Fi data network 106.

Analytics and Historical Data

The analytics module 1520 may collect, analyze and/or transmit historical data. For example, historical data may include measured link speeds, calculated network scores, and the like. In some embodiments, the module 1518 may transmit this data to or receive this data from the server 108.

In some embodiments, the analytics module 1520 may analyze collected data to inform determinations regarding switching between two networks. For example, prior to switching to a Wi-Fi network, the module 1518 may use historical data (e.g., previously calculated network scores, measured bandwidths, and so forth from the current device or a plurality of digital devices) in combination with current RSSI values to determine whether the device 102 is eligible to switch to that Wi-Fi network. This may, for example, prevent switching to a poor Wi-Fi network and having to immediately switch back to the cellular network. In some embodiments, the module 1518 only uses historic scores and values from the current device (e.g., device 102). In other embodiments, the module 1518 may be able to use scores and values collected by other users' devices, e.g., and stored on server 108 and download to the user device, e.g., device 102.

The communication module 1522 may be configured to communicate with a Wi-Fi data network 106 (e.g., IEEE 802.11x) and cellular wireless network 114 (LTE).

It will be appreciated that a module may be hardware, software, or a combination of both. In some embodiments, a module may include a processor and/or memory. In various embodiments, multiple modules may utilize or share one or more processors and/or memory. Additionally, functionality of a module may be provided by one or more of the other modules. For example, any of the functionality of the modules 1502-1522 may be included in any one or more of the other modules 1502-1522. It will further be appreciated that in some embodiments, the mobile device 102 may comprise a combination of any of the modules 1502-1522 and modules 202-224, and/or functionality thereof.

It will be appreciated that although Wi-Fi networks are discussed herein (e.g., with reference to networks 106, 110), the teachings herein may also apply to any type of non-cellular data network (e.g., Bluetooth).

Figure 16:
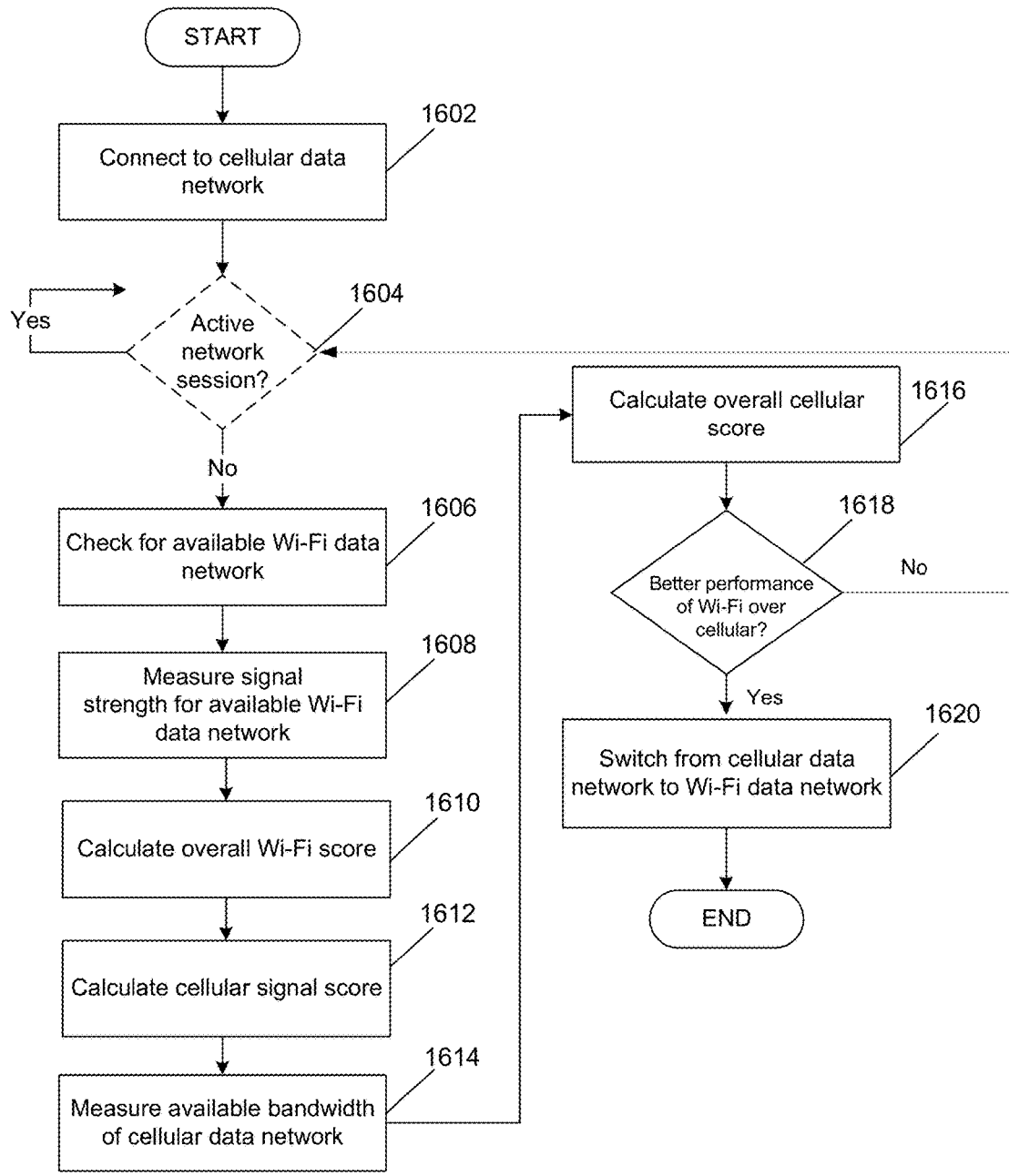
FIG. 16 is a flowchart illustrating an example operation of a mobile device switching from a cellular network to a Wi-Fi network based on a signal strength and measured bandwidth of the Wi-Fi network according to some embodiments.

FIG. 16 is a flowchart illustrating an example operation of a mobile device (e.g., mobile device 102) switching from a cellular network (e.g., network 114) to a Wi-Fi network (e.g., network 106) based on a signal strength and a measured bandwidth of the Wi-Fi network according to some embodiments. It will be appreciated that although the steps 1602-1620 below are described in a specific order, the steps 1602-1620 may also be performed in a different order. Each of the steps 1602-1620 may also be performed sequentially, or serially, and/or in parallel with one or more of the other steps 1602-1620 and/or steps in FIGS. 17-20.

In step 1602, the mobile device 102 connects to the cellular network 114. In some embodiments, a communication module (e.g., communication module 1524) assists with the connection to the cellular network 114.

In step 1604, the mobile device 102 determines whether it is actively in network use (e.g., the mobile device 102 is currently streaming media) in order to prevent user interruption. In some embodiments, a session module (e.g., session module 1506) may determine a current data usage (e.g., 0.5 Mb/s) and compare it against a network activity threshold (e.g., 1 Mb/s). For example, if the current data usage rate exceeds that network activity threshold value, then it may be assumed that the mobile device 102 is actively in use, and may prevent switching off of the cellular network 114. Alternatively, if the current data usage rate is below that network activity threshold value, then it may be assumed that the mobile device 102 is not actively in use, and the mobile device 102 may be eligible to switch from the cellular network 114 to an available Wi-Fi network 106. In some embodiments, this step may be optional.

In step 1606, if the mobile device 102 is not actively in network use, the mobile device 102 may check for an available Wi-Fi network. In some embodiments, a scan module (e.g., scan module 1502) may search for Wi-Fi networks within range of the mobile device 102. If more than one Wi-Fi network is available, the mobile device 102 may select the Wi-Fi network with the strongest signal (e.g., based on RSSI values) as a potential alternative to the currently selected cellular network. This function may be performed by an operating system of the mobile device 102. In some embodiments, a signal selection module (e.g., signal selection module 1518) may select the Wi-Fi network from among the available networks as the potential alternative.

In step 1608, if a Wi-Fi network 106 is available (e.g., within range of the mobile and permitting access to the mobile device 102), the mobile device 102 may measure a Wi-Fi signal strength for that Wi-Fi network 106. For example, a link module (e.g., link module 1510) may calculate the Wi-Fi signal strength based on one or more RSSI values associated with the Wi-Fi network 106. The link module 1510 may, for example, normalize the RSSI values to a value within a predetermined range (e.g., 0.0-1.0). An overall Wi-Fi network score may be calculated using the normalized signal strength value (step 1610).

In step 1612, the mobile device 102 may calculate a cellular signal score based on a measured signal strength and/or quality. In some embodiments, a link module (e.g., link module 1510) may calculate the signal score. For example, the mobile device 102 may measure a signal strength and/or quality associated with the cellular data network 114. The signal strength and/or quality may be based on one more RSRQ values.

In step 1614, the mobile device 102 may measure an available bandwidth for the cellular data network. In some embodiments, a bandwidth module (e.g., bandwidth module 1512) performs the measurement. For example, the measurement may be based on a difference in average roundtrip times for large and small message requests, such as UDP echo requests, made to a server (e.g., server 108) via the cellular data network 114.

In step 1616, the mobile device 102 may calculate an overall cellular network score based on the measured cellular bandwidth (step 1612) and calculated cellular signal score (step 1610). For example, the overall cellular network score may be a normalized cellular bandwidth score multiplied by the cellular signal score.

In step 1618, the mobile device 102 may compare the overall cellular network score and the overall Wi-Fi network score. In some embodiments, the score modification module 1516 performs the comparison.

In step 1620, the mobile device 102 may switch from the cellular data network 114 to the Wi-Fi network 106 based on the comparison performed in step 1618. For example, if the overall Wi-Fi network score exceeds the overall cellular network score, the mobile device may switch to the Wi-Fi network. In some embodiments, the comparison is performed by the score module or a signal selection module (e.g., signal selection module 1518).

Figure 17A:
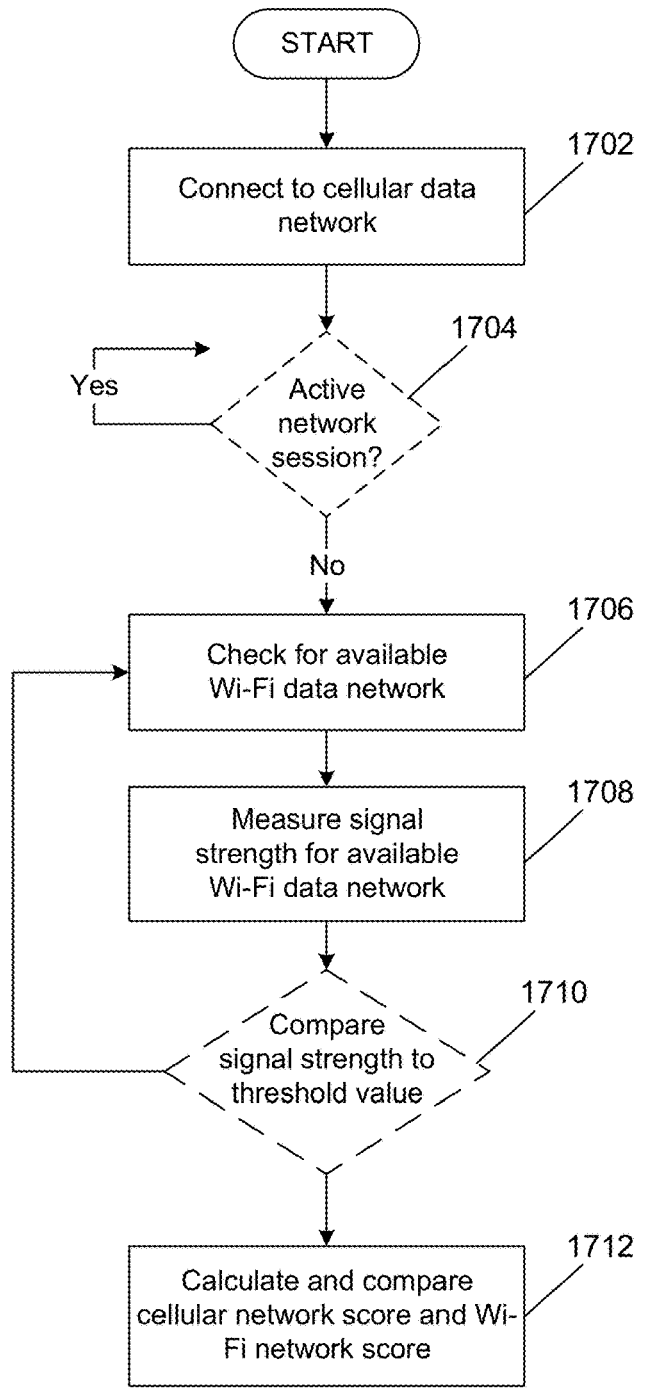
FIG. 17A is a flowchart illustrating an example operation of a mobile device performing initial threshold determinations associated with switching from a cellular network to a Wi-Fi network based on a comparison of the cellular network and the Wi-Fi network according to some embodiments.

FIG. 17A is a flowchart illustrating an example operation of a mobile device (e.g., mobile device 102) performing initial threshold determinations associated with switching from a cellular network (e.g., network 114) to a Wi-Fi network (e.g., network 106) based on a comparison of the cellular network and the Wi-Fi network according to some embodiments. It will be appreciated that although the steps 1702-1712 below are described in a specific order, the steps 1702-1712 may also be performed in a different order. Each of the steps 1702-1712 may also be performed sequentially, or serially, and/or in parallel with one or more of the other steps 1702-1712 and/or steps in FIG. 16 and FIGS. 18-20.

In step 1702, the mobile device 102 connects to the cellular network 114. In some embodiments, a communication module (e.g., communication module 1524) assists with the connection to the cellular network 114.

In step 1704, the mobile device 102 determines whether it is actively in network use (e.g., involved in a VOIP call, streaming media, or the like) in order to prevent user interruption. A session module (e.g., session module 1506) may determine a current data usage (e.g., 2 Mb/s) and compare it against a data usage threshold (e.g., 1.5 Mb/s). For example, if the current data usage rate exceeds that data usage threshold value, then it may be assumed that the mobile device 102 is actively in network use, and may prevent switching off of the cellular network 114. Alternatively, if the current data usage rate is below that data usage threshold value, then it may be assumed that the mobile device 102 is not actively in use, and the mobile device 1025 may be eligible to switch to an available Wi-Fi network 106. In some embodiments, this step may be optional.

In step 1706, if the mobile device 102 is not actively in network use, it may check for an available Wi-Fi network 106. In some embodiments, a scan module (e.g., scan module 1502) may search for Wi-Fi networks within range of the mobile. If more than one Wi-Fi network is available, the mobile device may select the Wi-Fi network with the strongest signal (e.g., based on RSSI values) as a potential alternative to the currently selected cellular network 114. In some embodiments, a signal selection module (e.g., signal selection module 1518) may select the Wi-Fi network from among the available networks as the potential alternative.

In step 1708, if a Wi-Fi network is available (e.g., within range of the mobile and permitting access to the mobile device), the mobile device may calculate a Wi-Fi signal score for that network. For example, a link module (e.g., link module 1510) may calculate the Wi-Fi signal score based on one or more RSSI values.

In step 1710, the mobile device 102 may compare the Wi-Fi signal score to a signal strength threshold value. In some embodiments, a score module (e.g., QoE score module 1514) may compare the Wi-Fi signal score to the signal strength threshold value. For example, if the Wi-Fi signal score exceeds the signal strength threshold value, then the mobile device may be eligible to switch to that network, based on further calculations and determination (steps 1712-1728). However, for example, if the Wi-Fi signal score is below the signal strength threshold value, then the mobile device may not be eligible to switch to that network. In such cases, the method may return to a previous step (e.g., step 1706). In some embodiments, the mobile device may compare raw RSSI values to threshold raw values.

In some embodiments, this step may be optional. For example, the mobile device may compare values and/or score (e.g., the Wi-Fi signal score) directly with other values and/or scores (e.g., the cellular signal score), rather than using thresholds.

Figure 17B:
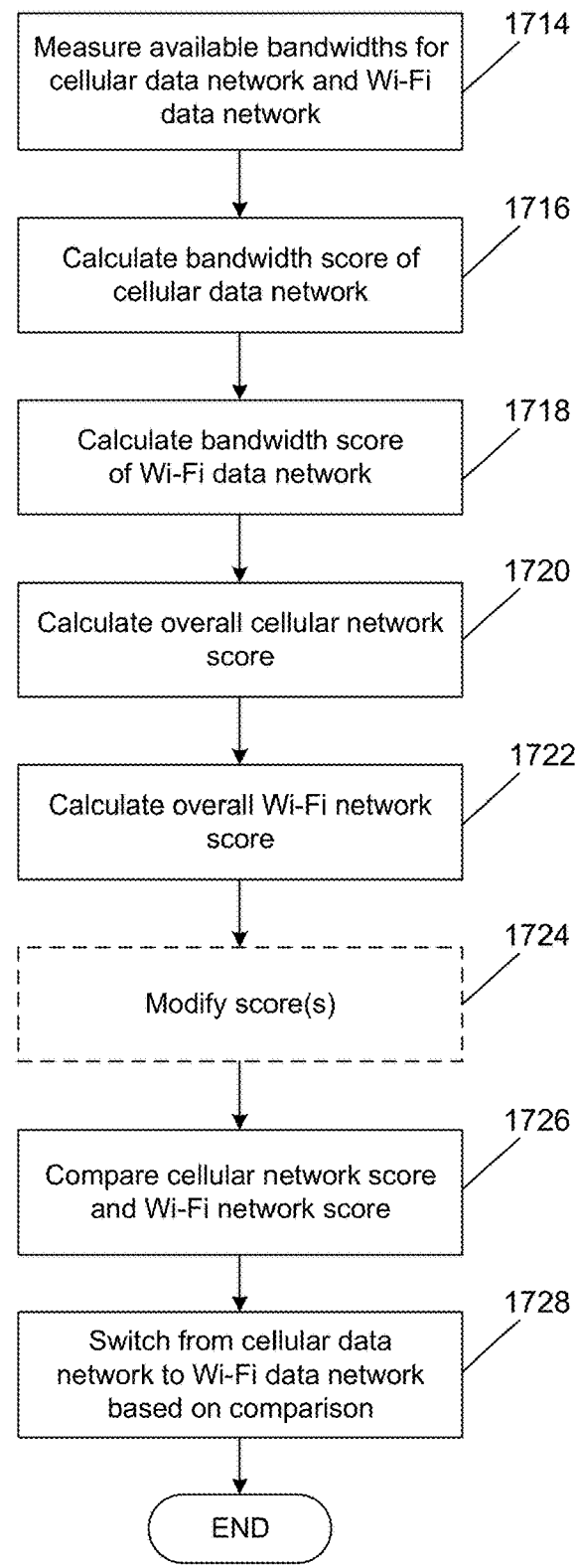
FIG. 17B is a flowchart illustrating an example operation of a mobile device switching from a cellular network to a Wi-Fi network based on a comparison of the cellular network and the Wi-Fi network according to some embodiments.

FIG. 17B is a flowchart illustrating an example operation of a mobile device (e.g., mobile device 102) switching from a cellular network (e.g., network 114) to a Wi-Fi network (e.g., network 106) based on a comparison of the cellular network and the Wi-Fi network according to some embodiments. It will be appreciated that although the steps 1714-1728 below are described in a specific order, the steps 1714-1728 may also be performed in a different order. Each of the steps 1714-1728 may also be performed sequentially, or serially, and/or in parallel with one or more of the other steps 1702-1728 and/or steps in FIG. 16 and FIGS. 18-20.

In step 1714, the mobile device may measure an available bandwidth for the cellular network 114 and an available bandwidth for the Wi-Fi data network 106. In some embodiments, a bandwidth module (e.g., bandwidth module 1512) performs the measurement. For example, the measurements may be calculated from the difference in average roundtrip times for large and small echo requests, such as UDP echo requests made to a server (e.g., server 108).

Figure 22:
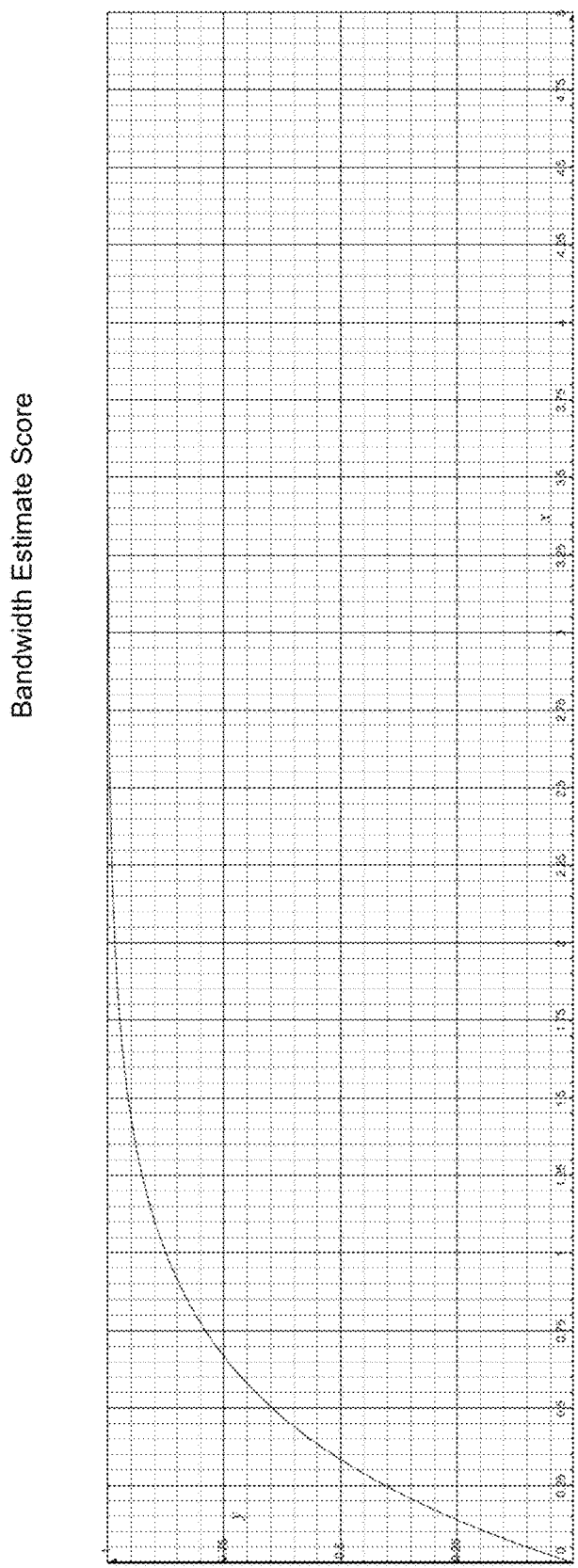
FIG. 22 is an example graph showing an example equation for calculating a bandwidth score based on an measured bandwidth according to some embodiments.

In step 1716, the mobile device 102 may calculate a bandwidth score of the cellular data network 114 based on the measured available bandwidth for the cellular data network 114. The measurement may be normalized to a predetermined range (e.g., 0.0-1.0) to create the cellular bandwidth score (e.g., as shown in FIG. 22). In some embodiments, the bandwidth module 1512 may calculate the cellular bandwidth score.

In step 1718, the mobile device may calculate a bandwidth score of the Wi-Fi data network 106 based on the measured available bandwidth for the Wi-Fi data network 106. The measurement may be normalized to a predetermined range (e.g., 0.0-1.0) to create the Wi-Fi bandwidth score, e.g., as shown in FIG. 22. In some embodiments, the bandwidth module 1512 may calculate the Wi-Fi bandwidth score.

In step 1720, the mobile device 102 may calculate an overall cellular network score for the cellular data network 116 based on at least the cellular bandwidth score. In some embodiments, the score module 1512 may calculate the overall cellular network score.

In step 1722, the mobile device 102 may calculate an overall Wi-Fi network score for the Wi-Fi data network 106 based on at least the Wi-Fi bandwidth score. In some embodiments, the score module 1512 may calculate the overall network score.

In some embodiments, a user interacting with a GUI (e.g., GUI 2100), may select a preference for Wi-Fi networks, and in response to that preference, increase the overall Wi-Fi network score and/or decrease the overall cellular network score. In step 1724, in order to bias network selection towards Wi-Fi or cellular (e.g., based on user and/or carrier input) the mobile device 102 may optionally modify any of the overall Wi-Fi network score, overall cellular score, cellular bandwidth score, and/or Wi-Fi bandwidth score. In some embodiments, a score modification module (e.g., score modification module 1516) performs the modifications.

In step 1726, the mobile device 102 compares the overall cellular network score (or the "modified" score if modified in step 1724) and the overall Wi-Fi network score (or the "modified" score if modified in step 1724). In some embodiments, the score modification module 1516 performs the comparison.

In step 1728, the mobile device 102 may switch from the cellular data network 114 to the Wi-Fi network 106 based on the comparison performed in step 1726. For example, if the overall Wi-Fi network score exceeds the overall cellular network score, the mobile devices may switch to the Wi-Fi network (step 1728). In various embodiments, the mobile device 102 may switch from the cellular data network 114 to the Wi-Fi network 106 if the overall Wi-Fi network score exceeds the overall cellular network score by more than a predetermined threshold amount. In some embodiments, the comparison is performed by the score module or a signal selection module (e.g., signal selection module 1518).

Figure 18A:
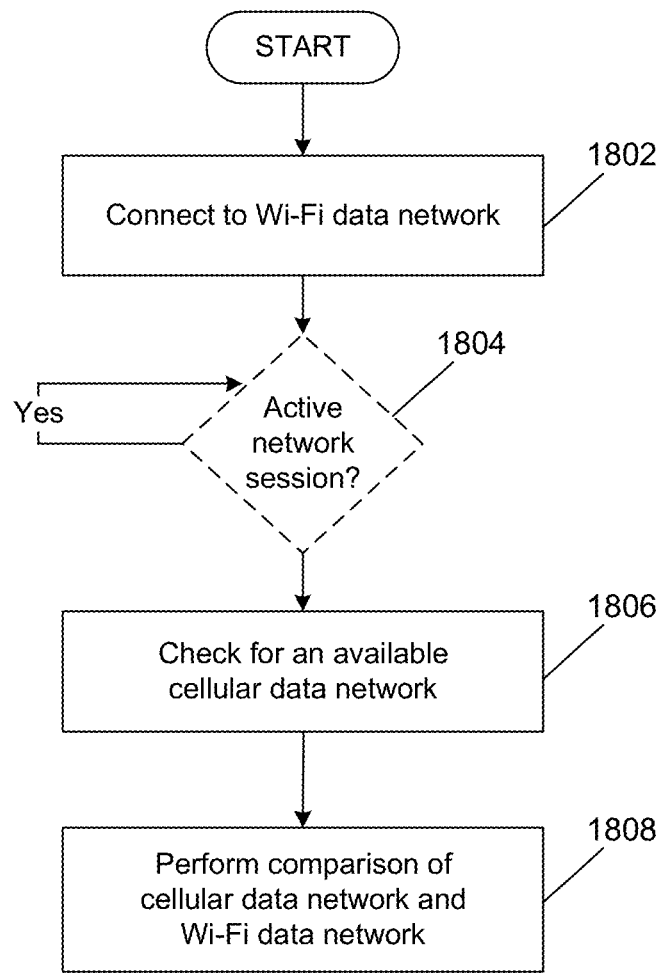
FIG. 18A is a flowchart illustrating an example operation of a mobile device performing initial threshold determinations associated with switching from a Wi-Fi network to cellular network according to some embodiments.

FIG. 18A is a flowchart illustrating an example operation of a mobile device performing initial threshold determinations associated with switching from a Wi-Fi network to cellular network according to some embodiments. It will be appreciated that although the steps 1802-1810 below are described in a specific order, the steps 1802-1810 may also be performed in a different order. Each of the steps 1802-1810 may also be performed sequentially, or serially, and/or in parallel with one or more of the other steps 1802-1810 and/or steps in FIGS. 16, 17 and 18B-20.

In step 1802, the mobile device 102 connects to the cellular network 114. In some embodiments, a communication module (e.g., communication module 1524) assists with the connection to the cellular network 114.

In step 1804, the mobile device 102 determines whether it is actively in network use in order to prevent user interruption. In some embodiments, a session module (e.g., session module 1506) may determine a current network data usage (e.g., 2 Mb/s) and compare it against a network data predetermined threshold (e.g., 1.5 Mb/s). For example, if the current network data usage rate exceeds that network data threshold value, then it may be assumed that the mobile device 102 is actively in network use, and may prevent switching networks. Alternatively, if the current data usage rate is below that network data threshold value, then it may be assumed that the mobile device 102 is not actively in network use, and the mobile device 102 may be eligible to switch to an available cellular data network 116. In some embodiments, this step may be optional.

In step 1806, if the mobile device 102 is not actively in network use, it may check for an available cellular data network 114. In some embodiments, a scan module (e.g., scan module 1502) may search for a cellular data network 114 within range of the mobile device 102.

In some embodiments, the mobile device 102 may compare the Wi-Fi signal score to a signal strength threshold value. In some embodiments, a score module (e.g., QoE score module 1514) may compare the Wi-Fi signal score to the signal strength threshold value. For example, if the Wi-Fi signal score is below the signal strength threshold value, then it may indicate that the Wi-Fi signal has sufficiently degraded that the mobile device 102 may be eligible to switch off of that network, based on further calculations and determination (steps 1812-1828). However, for example, if the Wi-Fi signal score is above the signal strength threshold value, then it may be assumed that the Wi-Fi network is of good or sufficient quality, and the mobile device may not be switched off of that Wi-Fi network. In such cases, the method may return to a previous step (e.g., step 1806). In some embodiments, the mobile device may compare raw RSSI values to threshold raw values.

In various embodiments, the mobile device 102 may test the bandwidth of the Wi-Fi network and compare the tested bandwidth against a bandwidth threshold. If the Wi-Fi signal score is below the bandwidth threshold value, then it may indicate that the Wi-Fi signal has sufficiently degraded that the mobile device 102 may be eligible to switch off of that network, based on further calculations and determination (steps 1812-1828).

In step 1808, the mobile device 102 performs a comparison of the cellular data network and the Wi-Fi data network. This process is further described with reference to FIG. 18B.

Figure 18B:
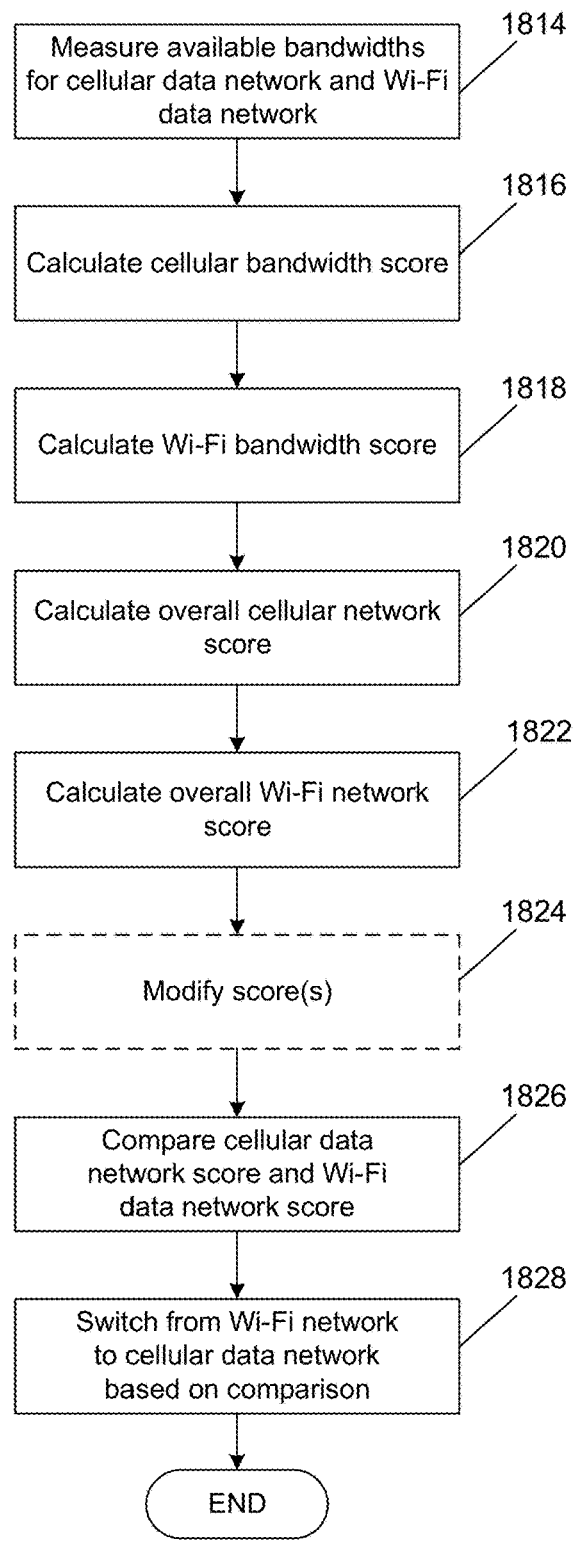
FIG. 18B is a flowchart illustrating an example operation of a mobile device switching from a Wi-Fi network to cellular network based a comparison of the cellular and Wi-Fi networks according to some embodiments.

FIG. 18B is a flowchart illustrating an example operation of a mobile device 102 switching from a Wi-Fi network 106 to cellular network 114 based a comparison of the cellular and Wi-Fi networks according to some embodiments. It will be appreciated that although the steps 1812-1826 below are described in a specific order, the steps 1812-1826 may also be performed in a different order. Each of the steps 1812-1826 may also be performed sequentially, or serially, and/or in parallel with one or more of the other steps 1802-1826 and/or steps in FIGS. 16-18A, 19 and 20.

In step 1814, the mobile device 102 may measure an available bandwidth for the cellular network 114 and an available bandwidth for the Wi-Fi data network 106. In some embodiments, a bandwidth module (e.g., bandwidth module 1512) performs the estimation. For example, the measurements may be calculated from a difference in average roundtrip times for large and small echo requests, such as UDP echo requests made to a server (e.g., server 108). The mobile device 102 may, in some embodiments, utilize previous bandwidth measurements performed within a predetermined period of time relative to the performance of step 1814.

In step 1816, the mobile device 102 may calculate a cellular bandwidth score of the cellular data network based on the measured available bandwidth for the cellular data network. The cellular bandwidth score may be normalized to a predetermined range (e.g., 0.0-1.0) to create the cellular bandwidth score (e.g., as shown in FIG. 22). In some embodiments, the bandwidth module may calculate the cellular bandwidth score.

In step 1818, the mobile device may calculate a Wi-Fi bandwidth score of the Wi-Fi data network based on the measured available bandwidth for the Wi-Fi data network. The Wi-Fi bandwidth score may be normalized to a predetermined range (e.g., 0.0-1.0) to create the Wi-Fi bandwidth score (e.g., as shown in FIG. 22). In some embodiments, the bandwidth module may calculate the Wi-Fi bandwidth score.

In step 1820, the mobile device may calculate an overall cellular network score for the cellular data network based on at least the cellular bandwidth score. In some embodiments, the score module may calculate the overall cellular network score.

In step 1822, the mobile device may calculate an overall Wi-Fi network score for the Wi-Fi data network based on at least the Wi-Fi bandwidth score. In some embodiments, the score module may calculate the overall Wi-Fi network score.

In optional step 1824, in order to optionally bias network selection towards Wi-Fi or cellular (e.g., based on user and/or carrier input) the mobile device 102 may modify, for example, any of the overall Wi-Fi network score, overall cellular network, cellular bandwidth score, or Wi-Fi bandwidth score. For example, a user interacting with a GUI (e.g., GUI 2100), my select a preference for Wi-Fi networks, and in response to that preference, increase the overall Wi-Fi network score and/or decrease the overall cellular network score. In some embodiments, a score modification module (e.g., score modification module 1516) performs the modifications.

In step 1826, the mobile device 102 compares the overall cellular network score (or the "modified" score if modified in step 1824) and the overall Wi-Fi network score (or the "modified" score if modified in step 1824). In some embodiments, the score module performs the comparison.

In step 1826, the mobile device 102 may switch from the Wi-Fi network 106 to the cellular data network 114 based on the comparison performed in step 1826. For example, if the overall cellular network score exceeds the Wi-Fi network score by more than a predetermined threshold amount, the mobile device 102 may switch to the cellular data network (step 1828). In some embodiments, the comparison is performed by the score module or a signal selection module (e.g., signal selection module 1518).

Figure 19:
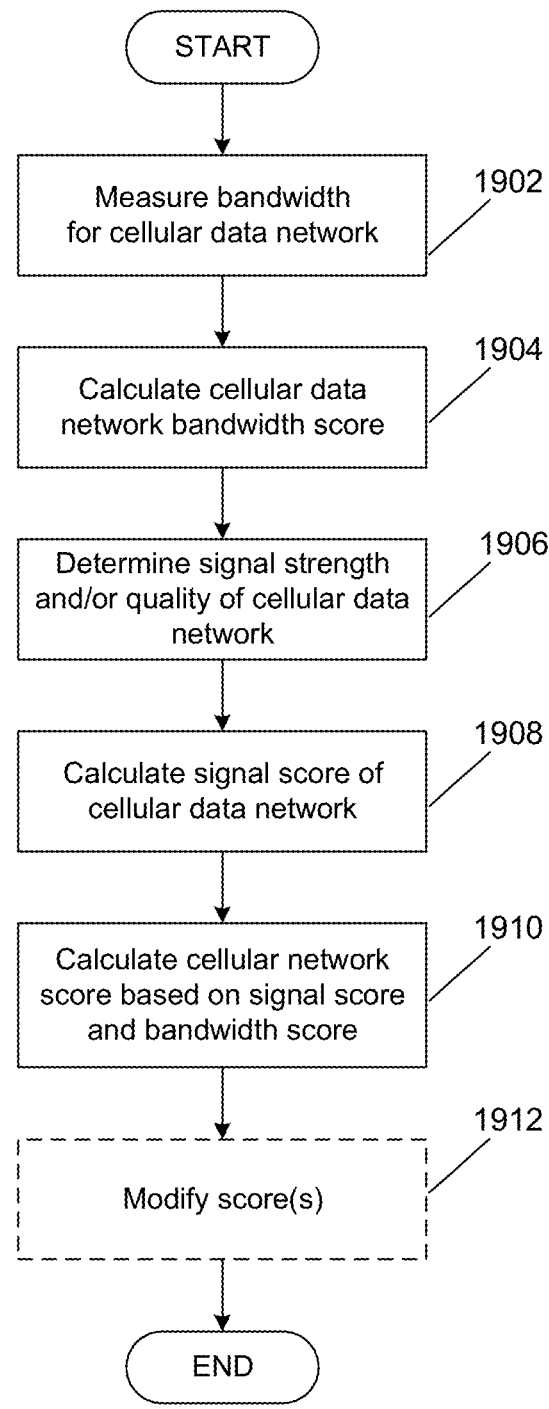
FIG. 19 is a flowchart illustrating an example calculation of a cellular network score according to some embodiments.

FIG. 19 is a flowchart illustrating an example calculation of a cellular network score according to some embodiments. It will be appreciated that although the steps 1902-1914 below are described in a specific order, the steps 1902-1914 may also be performed in a different order. Each of the steps 1902-1914 may also be performed sequentially, or serially, and/or in parallel with one or more of the other steps 1902-1914 and/or steps in FIGS. 16-18 and FIG. 20.

In step 1902, the mobile device 102 may measure an available bandwidth for a cellular network (e.g., network 114). In some embodiments, a bandwidth module (e.g., bandwidth module 1512) performs the estimation. For example, the measurement may be calculated from a difference in average roundtrip times for large and small message requests, such as UDP echo requests, made to a server (e.g., server 108) via the cellular data network 114.

In step 1904, the mobile device 102 may calculate a bandwidth score of the cellular data network based on the measured available bandwidth for the cellular data network. In some embodiments, the bandwidth module may calculate the bandwidth score.

In step 1906, the mobile device 102 may determine a signal quality or strength associated with the cellular data network 114. For example, the signal quality or strength may be based on one more RSRQ values. In some embodiments, a link module (e.g., link module 1510) may determine the signal strength or quality.

In step 1908, the mobile device 102 may calculate a signal score based on the determined signal quality or strength. In some embodiments, the link module may calculate the signal score.

In step 1910, the mobile device 102 may calculate an overall cellular network score based on the bandwidth score and the signal score. For example, the overall cellular network score may be the bandwidth score multiplied by the signal score. In some embodiments, the score module may calculate the overall cellular network score.

In optional step 1912, in order to bias network selection towards or against cellular network selection (e.g., based on user and/or carrier input) the mobile device 102 may modify, for example, any of the overall cellular network, bandwidth score, or signal score. In some embodiments, a score modification module (e.g., score modification module 1516) performs the modifications. In some embodiments, this step may be optional.

Figure 20:
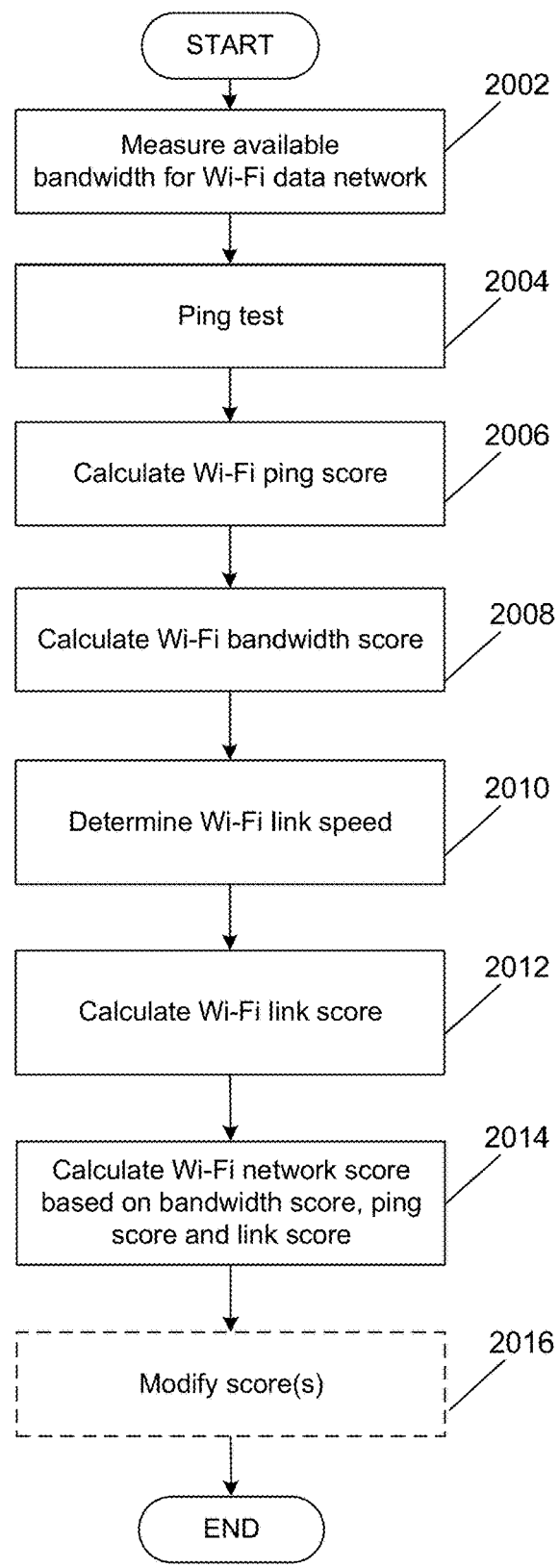
FIG. 20 is a flowchart illustrating an example calculation of a Wi-Fi network score according to some embodiments.

FIG. 20 is a flowchart illustrating an example calculation of a Wi-Fi network score according to some embodiments. It will be appreciated that although the steps 2002-2016 below are described in a specific order, the steps 2002-2016 may also be performed in a different order. Each of the steps 2002-2016 may also be performed sequentially, or serially, and/or in parallel with one or more of the other steps 2002-2016 and/or steps in FIGS. 16-19.

In step 2002, the mobile device 102 may measure an available bandwidth for a Wi-Fi network (e.g., network 106). In some embodiments, a bandwidth module (e.g., bandwidth module 1512) performs the estimation. For example, the measurement may be calculated from a difference in average roundtrip times for large and small echo requests, such as UDP echo requests made to a server (e.g., server 108) via the Wi-Fi network and/or communication network 110.

In step 2004, the mobile device may perform a ping test on the Wi-Fi network. For example, a ping module (e.g., ping module 1508) may transmit one or more pings to the server on the communication network using a communication module (e.g., communication module 1524). The server 108 may provide a set of ping responses back to the mobile device 102. Each ping response may be measured to determine a ping time (e.g., a roundtrip timestamp) and/or packet loss. In various embodiments, the server 108 is an echo server.

In step 2006, the mobile device 102 may calculate a ping score based on the results of the ping test. For example, ping times may be calculated using the following expression:

$$a = \text{MAX}((1-(STDDEV(\text{times})/\text{AVERAGE}(\text{times})), 0.0)$$

Packet loss may be calculated using the following expression:

$$b = e^{-(dropped\ ^\wedge 3)}/100$$

The ping score may be calculated by the following:

$$\text{score} = a * b.$$

In some embodiments the ping module or score module may calculate the ping score.

In step 2008, the mobile device 102 may calculate a bandwidth score of the Wi-Fi network based on the measured available bandwidth for Wi-Fi network. In some embodiments, the bandwidth module may calculate the bandwidth score.

In step 2010, the mobile device 102 may determine a link speed of the Wi-Fi connection and calculate a link score based on that link speed (step 2012). In some embodiments a link module (e.g., link module 1510) may determines the link speed and calculate the link score. The link module may normalize that link speed to a predetermined range (e.g., 0.0-1.0) in order to, for example, facilitate comparison between different carrier types.

In step 2014, the mobile may calculate an overall Wi-Fi network score based on the bandwidth score, ping score and link score. For example, the overall cellular network score may be the bandwidth score multiplied by the score ping score multiplied by the link score. In some embodiments, a score module (e.g., QoE score module 1514) may calculate the overall Wi-Fi network score.

In optional step 2016, in order to bias network selection towards or against Wi-Fi network selection, e.g., based on user and/or carrier input, the mobile device may modify, for example, any of the overall Wi-Fi network, link score, or ping score.

Figure 21:
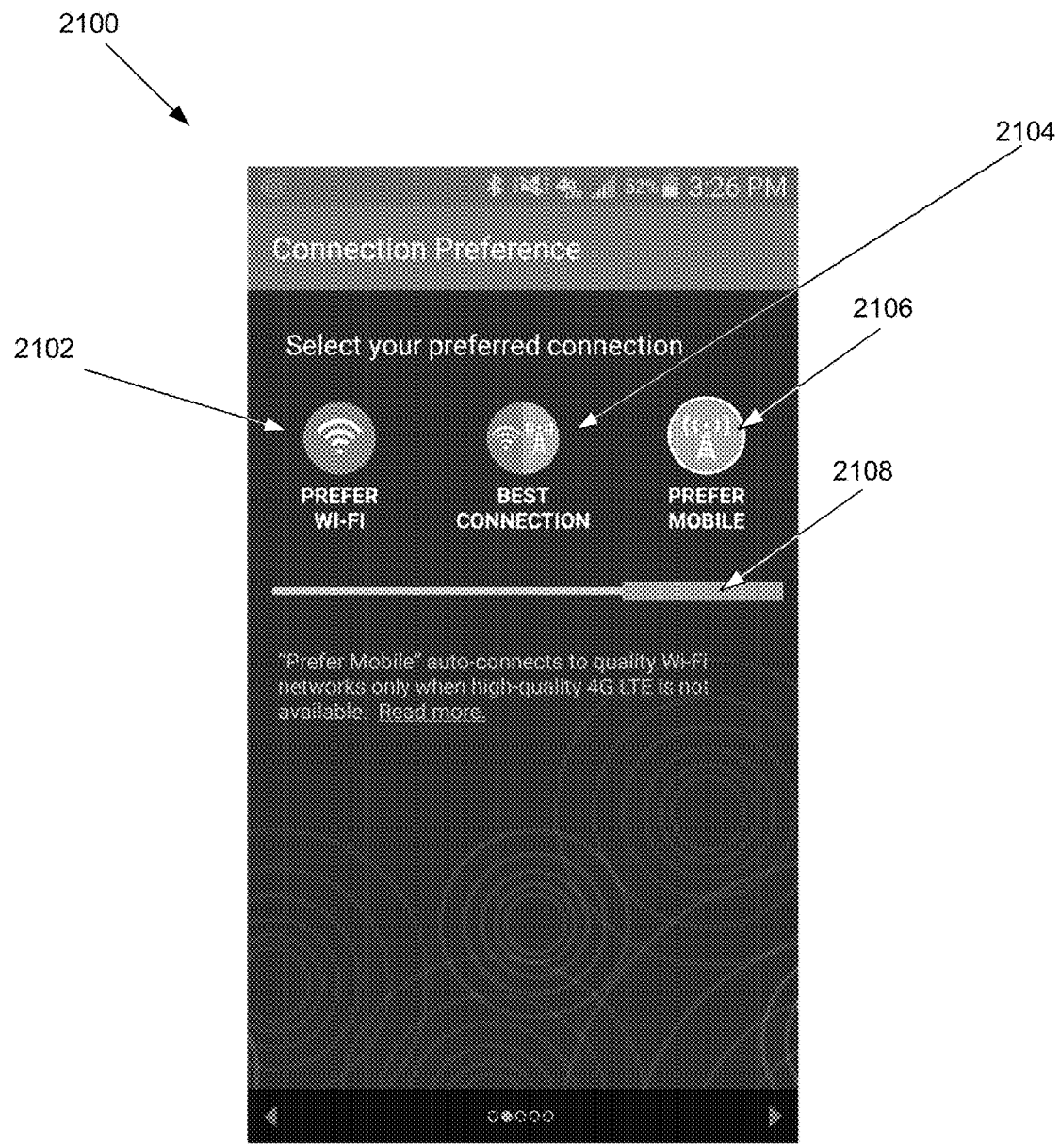
FIG. 21 illustrates an example GUI for selecting a network preference in order to perform score and/or threshold modification according to some embodiments.

FIG. 21 illustrates an example GUI 2100 for selecting a network preference in order to perform score and/or threshold modification according to some embodiments. The GUI 2100 may execute on the mobile device 102 and include a "PREFER WI-FI" icon 2102, a "BEST CONNECTION" icon 2104, a "PREFER MOBILE" icon 2106, and slider icon 2108. As shown, a user has positioned the slider 2108 to "PREFER MOBILE." This may allow the score modification module 1516 to modify scores and/or threshold values, as described above and below, in favor on cellular data networks (e.g., network 114). Also, as shown, the slider 2108 may be moved to prefer Wi-Fi or the best available connection.

Although only three positions are shown here, and a slider 2108 is used to set a position, it will be appreciated that other embodiments may have a lesser or greater number of such positions, and/or use different mechanism to set a position or select a preference. For example, in some embodiments, a user may select a preference by tapping on one of the icons 2102-2106, and use the slider 2108 to determine how much to weight any associated scores and/or threshold values towards that selected preference.

FIG. 22 is an example graph showing a curve of an example equation for calculating a bandwidth score based on a measured bandwidth according to some embodiments.

As with the link speed, as the bandwidth increases above a certain point the improvement in the experience is negligible for most purposes. That limit is somewhere around 2 Mbps in most cases (2 Mbps is sufficient to stream HD video happily). Given those parameters, a curve like this one will convert a measured bandwidth, in Mbps, to a score value:

The equation for this curve is as follows:

$$score=1-(2^{(-3*bandwidth)})$$

As with the link speed equation, there is an equivalent using Euler's constant:

$$score=1-(e^{(-2.1*bandwidth)})$$

FIG. 23 is an example graph showing an example function to calculate packet loss according to some embodiments. In some embodiments, the packet loss factor is calculated from a number of dropped packets in the set. Assuming a set of 20 pings, an example function used to calculate the loss factor is shown in graph. Losing just 1 or 2 of the 20 may have little impact, but as the count of dropped packets goes above 2, the loss factor may become more significant. The formula used to generate graph is as follows:

$$b=e^{-(dropped^{\wedge}3)/100}$$

FIG. 24 is an example graph showing a curve of an example formula for calculating a signal score based on RSRQ values according to some embodiments. In the illustrated embodiment, the example formula is:

$$score=1-e^{(-0.3*(RSRQ+19))}$$

FIG. 25 is an example graph showing a curve of an example equation for normalizing a link speed value to a link score according to some embodiments. In some embodiments, any link speed above 10 Mb/s may be considered "perfect" (e.g., score 1.0) for purposes of score calculation, but may not actually represent a perfect connection. However, a linear scale may not be practical once link speeds exceed a certain threshold, e.g., approximately 30 Mbp/s or above range, since the AP speed is unlikely to be the limiting factor in the user quality of experience.

In this example curve, link speed is along the X-axis, and link score is along the Y-axis. By the time we get to around 30 Mbps the link is considered essentially good enough. Below that it drops off slowly at first, but then below 11 Mb/s it drops much faster. The example equation for this curve is as follows:

$$score=1-(2^{(-0.25*linkspeed)})$$

An alternative, which may be simpler to calculate on some platforms, would substitute e for the 2:

$$score=1-(e^{(-0.17*linkspeed)})$$

The present invention(s) described above with reference to exemplary embodiments. It will be apparent to those skilled in the art that various modifications may be made and other embodiments can be used without departing from the broader scope of the present invention(s). Therefore, these and other variations upon the exemplary embodiments are intended to be covered by the present invention(s).

The invention claimed is:

1. A method performed by a digital device, the method comprising:
   connecting to a wireless fidelity (Wi-Fi) data network, the digital device being further configured to communication over a cellular data network;
   measuring a signal strength value of the Wi-Fi data network;
   measuring a bandwidth of the Wi-Fi data network;
   determining a link speed of a current connection between the digital device and the Wi-Fi data network; and calculating a link score based on the link speed;
   transmitting a plurality of pings to a Quality Of Experience (QoE) system accessible over the Wi-Fi data network;
   receiving a plurality of ping responses from the QoE system in response to the plurality pings;
   and calculating a ping score based on the plurality of ping responses;
   calculating an overall Wi-Fi score based on the measured signal strength value of the Wi-Fi data network, the link score, the ping score, and the measured available bandwidth of the Wi-Fi data network;
   measuring a signal strength value of the cellular data network;
   measuring an available bandwidth of the cellular data network;
   calculating an overall cellular data network score based on the measured signal strength value of the cellular data network and the measured available bandwidth of the cellular data network;

comparing the overall Wi-Fi score and the overall cellular data network score; and switching from the Wi-Fi data network to the cellular data network based on the comparison.

2. The method of claim 1, further comprising determining whether the digital device is in active network use based upon a current data usage of the cellular data network by the digital device.

3. The method of claim 1, further comprising calculating a link quality score based on a Reference Signal Received Quality (RSRQ) value associated with the connection of the digital device to the cellular network, the overall cellular data network score being further based on the link quality score.

4. The method of claim 1, further comprising modifying the cellular network score or the Wi-Fi network score based upon a selected preference for a cellular data network connection or a Wi-Fi data network connection.

5. The method of claim 4, wherein the selected preference is selected by a user of the digital device or a carrier of the cellular data network.

\* \* \* \* \*